(12) United States Patent
Qureshi

(10) Patent No.: US 11,455,827 B2
(45) Date of Patent: Sep. 27, 2022

(54) HIGH CONFIDENCE PREDICTED PROFILES FOR ONLINE DATING MATCHING USING CONTINUOUSLY LEARNING MACHINE LEARNING MODELS TRAINED FOR EACH USER WITH PHYSICAL AND FACIAL ATTRIBUTES

(71) Applicant: Hourglass Software LLC, Dover, DE (US)

(72) Inventor: Faisal A. Qureshi, Seattle, WA (US)

(73) Assignee: HOURGLASS SOFTWARE LLC, Dover, DE (US)

( * ) Notice: Subject to any disclaimer, the term of this patent is extended or adjusted under 35 U.S.C. 154(b) by 398 days.

(21) Appl. No.: 16/670,883

(22) Filed: Oct. 31, 2019

(65) Prior Publication Data

US 2021/0049348 A1 Feb. 18, 2021

Related U.S. Application Data

(60) Provisional application No. 62/886,309, filed on Aug. 13, 2019.

(51) Int. Cl.
| | | |
|---|---|---|
| *G06K 9/00* | (2022.01) | |
| *G06V 40/16* | (2022.01) | |
| *G06F 17/16* | (2006.01) | |
| *G06N 20/00* | (2019.01) | |

(52) U.S. Cl.
CPC ............ *G06V 40/165* (2022.01); *G06F 17/16* (2013.01); *G06N 20/00* (2019.01)

(58) Field of Classification Search
CPC .... G06V 40/165; G06K 9/00; G06K 9/00248; G06N 20/00; G06N 3/08; G06F 17/16; G06F 16/23
See application file for complete search history.

(56) References Cited

U.S. PATENT DOCUMENTS 9,679,259 B1 * 6/2017 Frind ..................... G06N 20/00
2020/0126533 A1 * 4/2020 Doyle ................. G10L 15/1815

* cited by examiner

*Primary Examiner* — Tuan H Nguyen
(74) *Attorney, Agent, or Firm* — Amin, Turocy & Watson, LLP

(57) ABSTRACT

Machine learning models can be trained to vend profiles with a high likelihood of matching with a user comprises: training machine learning models with feature vectors representing potential profile matches identified as input to a user match selection process, updating the trained models with feature vectors identified as further input to the selection process, in response to the updating, swapping the trained model out of and a further trained machine learning model into a foreground execution space, resulting in the untrained model being in the foreground and the trained model being in a processing background, after satisfying a defined criterion, injecting an outlier potential match entity as supplemental input to the further training with a supplemental feature vector as further input to the selection process, determining respective confidence values corresponding to candidate profiles accessible to the selection process, and rendering profile images of candidate profiles for the selection process.

20 Claims, 10 Drawing Sheets

```
                                                                    ┌─ 100a

┌─────────────────────────────────────────────────────────────────┐
│ training, by a system comprising a processor, a machine learning model with at │
│   least one first feature vector representative of at least one potential first match │ ┌─ 110
│    entity identified by a user of the system as input to a selection process for at │
│    least one matching entity to be a match for the user, wherein the at least one │
│  first feature vector comprises at least one of: at least one first ratio applicable to │
│     at least one facial first attribute of the at least one potential first match entity │
│    extracted from first facial recognition of at least one first image of the at least │
│        one potential first match entity, at least one first height of the at least one │
│          potential first match entity, at least one first hair color of the at least one │
│          potential first match entity, at least one first eye color of the at least one │
│      potential first match entity, or at least one first bias attributable to the user of │
│       the system applicable to the selection process for the at least one matching │
│         entity determined by natural language processing of first textual content │
│     attributable to the at least one potential first match entity, resulting in a trained │
│        machine learning model, wherein the trained machine learning model is in a │
│          foreground execution space of the system, and wherein the trained machine │
│         learning model is further trained in a background processing space of the │
│          system while the trained machine learning model is usable for the selection │
│        process for the at least one matching entity in the foreground execution space │
└─────────────────────────────────────────────────────────────────┘
                                        │
                                        ▼
┌─────────────────────────────────────────────────────────────────┐
│  updating the trained machine learning model comprising training the trained │
│        machine learning model further with at least one second feature vector │
│     representative of at least one potential second match entity identified by the │ ┌─ 120
│   user of the system as further input to the selection process for the at least one │
│    matching entity, wherein the at least one second feature vector comprises at │
│     least one of: at least one second ratio applicable to at least one second facial │
│ attribute of the at least one potential second match entity extracted from second │
│       facial recognition of at least one second image of the at least one potential │
│        second match entity, at least one second height of the at least one potential │
│    second match entity, at least one second hair color of the at least one potential │
│     second match entity, at least one second eye color of the at least one potential │
│      second match entity, or at least one second bias attributable to the user of the │
│      system further applicable to the selection process for the at least one matching │
│        entity determined by natural language processing of second textual content │
│          attributable to the user of the system, resulting in a further trained machine │
│                                 learning model │
└─────────────────────────────────────────────────────────────────┘
                                        │                           ┌─ 130
                                        ▼
┌─────────────────────────────────────────────────────────────────┐
│   in response to the updating of the trained machine learning model, swapping │
│   the trained machine learning model out of the foreground execution space, and │
│         swapping the further trained machine learning model into the foreground │
│  execution space, resulting in the untrained machine learning model being in the │
│      foreground execution space and the trained machine learning model being in │
│                          the background processing space │
└─────────────────────────────────────────────────────────────────┘
                                        │
                                        ▼
                                   To Fig. 1B
```

410 — training, by the device, a machine learning model with first feature vectors representative of potential first match entities identified by at least one user of the device as inputs to a selection process for matching entities to be matches for the at least one user of the device, the first feature vectors respectively comprising: first ratios applicable to facial first attributes of the potential first match entities extracted from first facial recognition of first images of the potential first match entities, first heights of the potential first match entities, first hair colors of the potential first match entities, first eye colors of the potential first match entities, or first biases attributable to the at least one user of the device applicable to the selection process for the matching entities determined by natural language processing of first textual content attributable to the potential first match entities, resulting in a trained machine learning model

420 — updating the trained machine learning model comprising training the trained machine learning model further with second feature vectors representative of potential second match entities identified by the at least one user of the device as further inputs to the selection process for the matching entities, the second feature vectors comprising: second ratios applicable to second facial attributes of the potential second match entities extracted from second facial recognition of second images of the potential second match entities, second heights of the potential second match entities, second hair colors of the potential second match entities, second eye colors of the potential second match entities, or second biases attributable to the at least one user of the device further applicable to the selection process for the matching entities determined by natural language processing of second textual content attributable to the at least one user of the device, resulting in a further trained machine learning model, wherein the updating the trained machine learning model comprises: swapping the trained machine learning model out of the foreground execution space, and swapping the further trained machine learning model into the foreground execution space, resulting in the untrained machine learning model being in the foreground execution space and the trained machine learning program being in the background processing space, and iteratively performing the updating and the swapping for additional feature vectors representative of additional potential match entities received by the device as additional inputs to the selection process for the matching entities, thereby continuously evolving the further trained machine learning model as a continuously evolved trained machine learning model applicable to the selection process for the matching entities

430 — in response to a defined criterion being satisfied, injecting outlier potential match entities as supplemental inputs to the training of the trained machine learning model further with supplemental feature vectors representative of supplemental match entities, not identified by the at least one user of the device, as further inputs to the selection process for the matching entities, the supplemental feature vectors comprising: supplemental ratios applicable to supplemental facial attributes of the potential supplemental match entities extracted from third facial recognition of supplemental images of the potential second match entities, heights of the potential supplemental match entities, hair colors of the potential supplemental match entities, or eye colors of the potential supplemental match entities

440 — for candidate profiles accessible to the selection process for the matching entities, applying the continuously evolved trained machine learning model to determine respective confidence values corresponding to the candidate profiles, wherein the respective confidence values represent respective likelihoods that the candidate profiles are part of the matching entities of the selection process to be the matches for the at least one user

450 — as a defined function of the respective confidence values, rendering at least profile images of profiles of the candidate profiles for the selection process

510 — training, by the system, the first and second machine learning models with at least one first feature vector representative of at least one potential first match entity identified by a user of the system as input to a selection process for at least one matching entity to be a match for the user, the at least one first feature vector comprising at least one of: at least one first ratio applicable to at least one facial first attribute of the at least one potential first match entity extracted from first facial recognition of at least one first image of the at least one potential first match entity, at least one first height of the at least one potential first match entity, at least one first hair color of the at least one potential first match entity, at least one first eye color of the at least one potential first match entity, or at least one first bias attributable to the user of the system applicable to the selection process for the at least one matching entity determined by natural language processing of first textual content attributable to the at least one potential first match entity, resulting in a trained first machine learning model

▼

520 — updating the trained second machine learning model comprising training the trained second machine learning model further with at least one second feature vector representative of at least one potential second match entity identified by the user of the system as further input to the selection process for the at least one matching entity, the at least one second feature vector comprising at least one of: at least one second ratio applicable to at least one second facial attribute of the at least one potential second match entity extracted from second facial recognition of at least one second image of the at least one potential second match entity, at least one second height of the at least one potential second match entity, at least one second hair color of the at least one potential second match entity, at least one second eye color of the at least one potential second match entity, or at least one second bias attributable to the user of the system further applicable to the selection process for the at least one matching entity determined by natural language processing of second textual content attributable to the user of the system, resulting in a further trained second machine learning model

▼

530 — in response to the updating of the trained second machine learning model, swapping the trained first machine learning model out of the foreground execution space, and swapping the further trained second machine learning model into the foreground execution space, resulting in the further trained second machine learning model being in the foreground execution space and the trained first machine learning model being in the background processing space

▼

540 — in response to a defined criterion being satisfied, injecting an outlier potential match entity as supplemental input to the training of the trained first machine learning model and the further trained second machine learning model further with a supplemental feature vector representative of a supplemental match entity, not identified by the user of the system, as further input to the selection process for the at least one matching entity, the supplemental feature vector comprising at least one of: a supplemental ratio applicable to a supplemental facial attribute of the potential supplemental match entity extracted from third facial recognition of a supplemental image of the at least one potential second match entity, a height of the potential supplemental match entity, a hair color of the potential supplemental match entity, or an eye color of the potential supplemental match entity

▼

550 — iteratively performing the updating, the swapping, and the injecting for additional feature vectors representative of additional potential match entities received by the system as additional input to the selection process for the at least one matching entity, thereby continuously evolving the trained first machine learning model and the further trained second machine learning model as a continuously evolved trained machine learning model applicable to the selection process for the at least one matching entity

▼

560 — for candidate profiles accessible to the selection process for the at least one matching entity, applying the continuously evolved trained machine learning model to determine respective confidence values corresponding to the candidate profiles

▼

570 — as a defined function of the respective confidence values, rendering at least a profile image of profiles of the candidate profiles for the selection process

FIG. 5

HIGH CONFIDENCE PREDICTED PROFILES FOR ONLINE DATING MATCHING USING CONTINUOUSLY LEARNING MACHINE LEARNING MODELS TRAINED FOR EACH USER WITH PHYSICAL AND FACIAL ATTRIBUTES

The subject patent application claims priority to U.S. Provisional Patent Application No. 62/886,309, filed Aug. 13, 2019, and entitled "HIGH CONFIDENCE PREDICTED PROFILES FOR ONLINE DATING MATCHING USING CONTINUOUSLY LEARNING MACHINE LEARNING MODELS TRAINED FOR EACH USER WITH PHYSICAL AND FACIAL ATTRIBUTES," the entirety of which application is hereby incorporated by reference herein.

TECHNICAL FIELD

The subject disclosure generally relates to vending high confidence predicted profiles and increasing the likelihood of users "matching" with a vended profile, such as for, but not limited to, online dating sites and dating applications (hereinafter "dating applications"), using continuously-learning machine learning models that can be trained for each user with physical and facial attributes calculated from facial recognition, "about you" text analyzed by natural language understanding, and/or other preferences.

BACKGROUND

Conventional dating applications present their users with profiles of other users through various means: some conventional dating applications use a matching algorithm (e.g., match.com), some dating applications randomly present their users with profiles of other users based on nothing, and some dating applications present their users with profiles of other users based on the users' search parameters (e.g., location).

In this regard, vending profiles for dating applications is proliferating and becoming commercially feasible in the marketplace. However, vending for dating applications has raised concerns regarding the predictability of vended profiles "matching" with users of dating applications based on users' preferences.

The above-described background relating to vending profiles for dating applications is merely intended to provide a contextual overview of some current issues, and is not intended to be exhaustive. Other contextual information may become further apparent upon review of the following detailed description.

SUMMARY

The following presents a summary to provide a basic understanding of one or more embodiments. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, methods, devices, and/or systems that can vend high confidence predicted profiles and increase the likelihood of users "matching" with a vended profile for dating applications using continuously-learning Machine Learning models that can be trained for each user with physical and facial attributes calculated from facial recognition, "about you" text analyzed by Natural Language Understanding, and other preferences are described.

The present application discloses methods, devices, and/or systems that employ continuously-improving Machine Learning which uses a double-model based mechanism, where the physical traits of the faces of potential matches can be analyzed and calculated using facial recognition and the text in the profiles of potential matches is analyzed using Natural Language Understanding to identify profiles to which a user would more likely be physically attracted. This results in improving the speed of match making and the accuracy of the match making (from a physical attraction perspective) in dating applications.

The following embodiments describe novel approaches to vending high confidence predicted profiles and increasing the likelihood of users "matching" with a vended profile for dating applications. The novel approaches described herein use continuously-learning Machine Learning models that can be trained for each user with physical and facial attributes calculated from facial recognition, "about you" text analyzed by Natural Language Understanding, and other preferences (such as date of birth, height, eye color, hair color, emotion of the face, presence or absence of a beard or mustache, and/or whether or not the mouth is open).

According to an embodiment, a method is provided. The method comprising: training, by a system comprising a processor, a machine learning model with at least one first feature vector representative of at least one potential first match entity identified by a user of the system as input to a selection process for at least one matching entity to be a match for the user, the at least one first feature vector comprising at least one of: at least one first ratio applicable to at least one facial first attribute of the at least one potential first match entity extracted from first facial recognition of at least one first image of the at least one potential first match entity, at least one first height of the at least one potential first match entity, at least one first hair color of the at least one potential first match entity, at least one first eye color of the at least one potential first match entity, or at least one first bias attributable to the user of the system applicable to the selection process for the at least one matching entity determined by natural language processing of first textual content attributable to the at least one potential first match entity, resulting in a trained machine learning model, wherein the trained machine learning model is in a foreground execution space of the system, and wherein the trained machine learning model is further trained in a background processing space of the system while the trained machine learning model is usable for the selection process for the at least one matching entity in the foreground execution space; updating the trained machine learning model comprising training the trained machine learning model further with at least one second feature vector representative of at least one potential second match entity identified by the user of the system as further input to the selection process for the at least one matching entity, the at least one second feature vector comprising at least one of: at least one second ratio applicable to at least one second facial attribute of the at least one potential second match entity extracted from second facial recognition of at least one second image of the at least one potential second match entity, at least one second height of the at least one potential second match entity, at least one second hair color of the at least one potential second match entity, at least one second eye color of the at least one potential second match entity, or at least one second bias attributable to the user of the system further applicable to the selection process for the at least one matching entity determined by natural language processing of second textual content attributable to the user of the system, resulting in a further trained machine learning model; in response to the updating of the trained machine learning model, swapping the trained machine learning model out of the foreground execution space, and swapping the further trained machine learning model into the foreground execution space, resulting in the untrained machine learning model being in the foreground execution space and the trained machine learning model being in the background processing space; in response to a defined criterion being satisfied, injecting an outlier potential match entity as supplemental input to the training of the trained machine learning model further with a supplemental feature vector representative of a supplemental match entity, not identified by the user of the system, as further input to the selection process for the at least one matching entity, the supplemental feature vector comprising at least one of: a supplemental ratio applicable to a supplemental facial attribute of the potential supplemental match entity extracted from third facial recognition of a supplemental image of the at least one potential second match entity, a height of the potential supplemental match entity, a hair color of the potential supplemental match entity, or an eye color of the potential supplemental match entity; iteratively performing the updating, the swapping, and the injecting for additional feature vectors representative of additional potential match entities received by the system as additional input to the selection process for the at least one matching entity, thereby continuously evolving the further trained machine learning model as a continuously evolved trained machine learning model applicable to the selection process for the at least one matching entity; for candidate profiles accessible to the selection process for the at least one matching entity, applying the continuously evolved trained machine learning model to determine respective confidence values corresponding to the candidate profiles, wherein the respective confidence values represent respective likelihoods that the candidate profiles are part of the at least one matching entity of the selection process to be the match for the user; and as a defined function of the respective confidence values, rendering at least a profile image of profiles of the candidate profiles for the selection process.

In another embodiment, a device is provided. The device can comprise a processor; and a memory that stores executable instructions that, when executed by the processor, facilitate performance of operations, comprising: training, by the device, a machine learning model with first feature vectors representative of potential first match entities identified by at least one user of the device as inputs to a selection process for matching entities to be matches for the at least one user of the device, the first feature vectors respectively comprising: first ratios applicable to facial first attributes of the potential first match entities extracted from first facial recognition of first images of the potential first match entities, first heights of the potential first match entities, first hair colors of the potential first match entities, first eye colors of the potential first match entities, or first biases attributable to the at least one user of the device applicable to the selection process for the matching entities determined by natural language processing of first textual content attributable to the potential first match entities, resulting in a trained machine learning model, wherein the trained machine learning model is operable in a foreground execution space of the device, and wherein the trained machine learning model is further trained in a background processing space of the device while the trained machine learning model is usable for the selection process for the matching entities in the foreground execution space; updating the trained machine learning model comprising training the trained machine learning model further with second feature vectors representative of potential second match entities identified by the at least one user of the device as further inputs to the selection process for the matching entities, the second feature vectors comprising: second ratios applicable to second facial attributes of the potential second match entities extracted from second facial recognition of second images of the potential second match entities, second heights of the potential second match entities, second hair colors of the potential second match entities, second eye colors of the potential second match entities, or second biases attributable to the at least one user of the device further applicable to the selection process for the matching entities determined by natural language processing of second textual content attributable to the at least one user of the device, resulting in a further trained machine learning model, wherein the updating the trained machine learning model comprises: swapping the trained machine learning model out of the foreground execution space, and swapping the further trained machine learning model into the foreground execution space, resulting in the untrained machine learning model being in the foreground execution space and the trained machine learning program being in the background processing space, and iteratively performing the updating and the swapping for additional feature vectors representative of additional potential match entities received by the device as additional inputs to the selection process for the matching entities, thereby continuously evolving the further trained machine learning model as a continuously evolved trained machine learning model applicable to the selection process for the matching entities; in response to a defined criterion being satisfied, injecting outlier potential match entities as supplemental inputs to the training of the trained machine learning model further with supplemental feature vectors representative of supplemental match entities, not identified by the at least one user of the device, as further inputs to the selection process for the matching entities, the supplemental feature vectors comprising: supplemental ratios applicable to supplemental facial attributes of the potential supplemental match entities extracted from third facial recognition of supplemental images of the potential second match entities, heights of the potential supplemental match entities, hair colors of the potential supplemental match entities, or eye colors of the potential supplemental match entities; for candidate profiles accessible to the selection process for the matching entities, applying the continuously evolved trained machine learning model to determine respective confidence values corresponding to the candidate profiles, wherein the respective confidence values represent respective likelihoods that the candidate profiles are part of the matching entities of the selection process to be the matches for the at least one user; and as a defined function of the respective confidence values, rendering at least profile images of profiles of the candidate profiles for the selection process.

According to another embodiment, a system is provided. The system can comprise at least one processor, comprising: a first machine learning model in a foreground execution space; and a second machine learning model in a background processing space; and at least one memory that stores executable instructions that, when executed by the processor, facilitate performance of operations, comprising: training, by the system, the first and second machine learning models with at least one first feature vector representative of at least one potential first match entity identified by a user of the system as input to a selection process for at least one matching entity to be a match for the user, the at least one first feature vector comprising at least one of: at least one first ratio applicable to at least one facial first attribute of the at least one potential first match entity extracted from first facial recognition of at least one first image of the at least one potential first match entity, at least one first height of the at least one potential first match entity, at least one first hair color of the at least one potential first match entity, at least one first eye color of the at least one potential first match entity, or at least one first bias attributable to the user of the system applicable to the selection process for the at least one matching entity determined by natural language processing of first textual content attributable to the at least one potential first match entity, resulting in a trained first machine learning model, wherein the second machine learning model is further trained while the trained first machine learning model is usable for the selection process for the at least one matching entity in the foreground execution space, resulting in a trained second machine learning model; updating the trained second machine learning model comprising training the trained second machine learning model further with at least one second feature vector representative of at least one potential second match entity identified by the user of the system as further input to the selection process for the at least one matching entity, the at least one second feature vector comprising at least one of: at least one second ratio applicable to at least one second facial attribute of the at least one potential second match entity extracted from second facial recognition of at least one second image of the at least one potential second match entity, at least one second height of the at least one potential second match entity, at least one second hair color of the at least one potential second match entity, at least one second eye color of the at least one potential second match entity, or at least one second bias attributable to the user of the system further applicable to the selection process for the at least one matching entity determined by natural language processing of second textual content attributable to the user of the system, resulting in a further trained second machine learning model; in response to the updating of the trained second machine learning model, swapping the trained first machine learning model out of the foreground execution space, and swapping the further trained second machine learning model into the foreground execution space, resulting in the further trained second machine learning model being in the foreground execution space and the trained first machine learning model being in the background processing space; in response to a defined criterion being satisfied, injecting an outlier potential match entity as supplemental input to the training of the trained first machine learning model and the further trained second machine learning model further with a supplemental feature vector representative of a supplemental match entity, not identified by the user of the system, as further input to the selection process for the at least one matching entity, the supplemental feature vector comprising at least one of: a supplemental ratio applicable to a supplemental facial attribute of the potential supplemental match entity extracted from third facial recognition of a supplemental image of the at least one potential second match entity, a height of the potential supplemental match entity, a hair color of the potential supplemental match entity, or an eye color of the potential supplemental match entity; iteratively performing the updating, the swapping, and the injecting for additional feature vectors representative of additional potential match entities received by the system as additional input to the selection process for the at least one matching entity, thereby continuously evolving the trained first machine learning model and the further trained second machine learning model as a continuously evolved trained machine learning model applicable to the selection process for the at least one matching entity; for candidate profiles accessible to the selection process for the at least one matching entity, applying the continuously evolved trained machine learning model to determine respective confidence values corresponding to the candidate profiles, wherein the respective confidence values represent respective likelihoods that the candidate profiles are part of the at least one matching entity of the selection process to be the match for the user; and as a defined function of the respective confidence values, rendering at least a profile image of profiles of the candidate profiles for the selection process.

BRIEF DESCRIPTION OF DRAWINGS

FIGS. 1A and 1B illustrate an example flowchart of a method for training a machine learning model to vend profiles with a high likelihood of matching with a user, where a machine learning model with at least one first feature vector representative of at least one potential first match entity identified by a user as input to a selection process for at least one matching entity to be a match for the user is trained, the trained machine learning model is updated by training the machine learning model further with at least one second feature vector representative of at least one potential second match entity identified by the user as further input to the selection process for the at least one matching entity, in response to the updating of the trained machine learning model, the trained machine learning model is swapped out of a foreground execution space, and a further trained machine learning model is swapped into the foreground execution space, in response to a defined criterion being satisfied, an outlier potential match entity is injected as a supplemental input to the training of the trained machine learning model further with a supplemental feature vector representative of a supplemental match entity, not identified by the user, as further input to the selection process for the at least one matching entity, and the updating, the swapping, and the injecting for additional feature vectors representative of additional potential match entities received as additional input to the selection process for the at least one matching entity can be iteratively performed, in accordance with various example embodiments.

FIG. 4 illustrates an example flowchart of the operations of the device illustrated in FIG. 2, the operations comprising training, by the device, a machine learning model with first feature vectors representative of potential first match entities identified by at least one user of the device as inputs to a selection process for matching entities to be matches for the at least one user of the device, updating the trained machine learning model by training the trained machine learning model further with second feature vectors representative of potential second match entities identified by the at least one user of the device as further inputs to the selection process for the matching entities, swapping the trained machine learning model out of a foreground execution space, and swapping the further trained machine learning model into a foreground execution space, iteratively performing the updating and the swapping for additional feature vectors representative of additional potential match entities received by the device as additional inputs to the selection process for the matching entities, in response to defined criterions being satisfied, injecting outlier potential match entities as supplemental inputs to the training of the trained machine learning model further with supplemental feature vectors representative of supplemental match entities, not identified by the at least one user of the device, as further inputs to the selection process for the matching entities, for candidate profiles accessible to the selection process for the matching entities, applying the continuously evolved trained machine learning model to determine respective confidence values corresponding to the candidate profiles, and as a defined function of the respective confidence values, rendering at least profile images of profiles of the candidate profiles for the selection process, in accordance with various example embodiments.

FIG. 5 illustrates an example flowchart of the operations of the system illustrated in FIG. 3, the operations comprising training, by the system, first and second machine learning models with at least one first feature vector representative of at least one potential first match entity identified by a user of the system as input to a selection process for at least one matching entity to be a match for the user, updating the trained second machine learning model by training the trained second machine learning model further with at least one second feature vector representative of at least one potential second match entity identified by the user of the system as further input to the selection process for the at least one matching entity, in response to the updating of the trained second machine learning model, swapping the trained first machine learning model out of a foreground execution space and into a background processing space, and swapping the further trained second machine learning model out of the background processing space and into the foreground execution space, in response to a defined criterion being satisfied, injecting an outlier potential match entity as supplemental input to the training of the trained first machine learning model and the further trained second machine learning model further with a supplemental feature vector representative of a supplemental match entity, not identified by the user of the system, as further input to the selection process for the at least one matching entity, iteratively performing the updating, the swapping, and the injecting for additional feature vectors representative of additional potential match entities received by the system as additional input to the selection process for the at least one matching entity, for candidate profiles accessible to the selection process for the at least one matching entity, applying the continuously evolved trained machine learning model to determine respective confidence values corresponding to the candidate profiles, and as a defined function of the respective confidence values, rendering at least a profile image of profiles of the candidate profiles for the selection process, in accordance with various example embodiments.

DETAILED DESCRIPTION

Figure 1B:
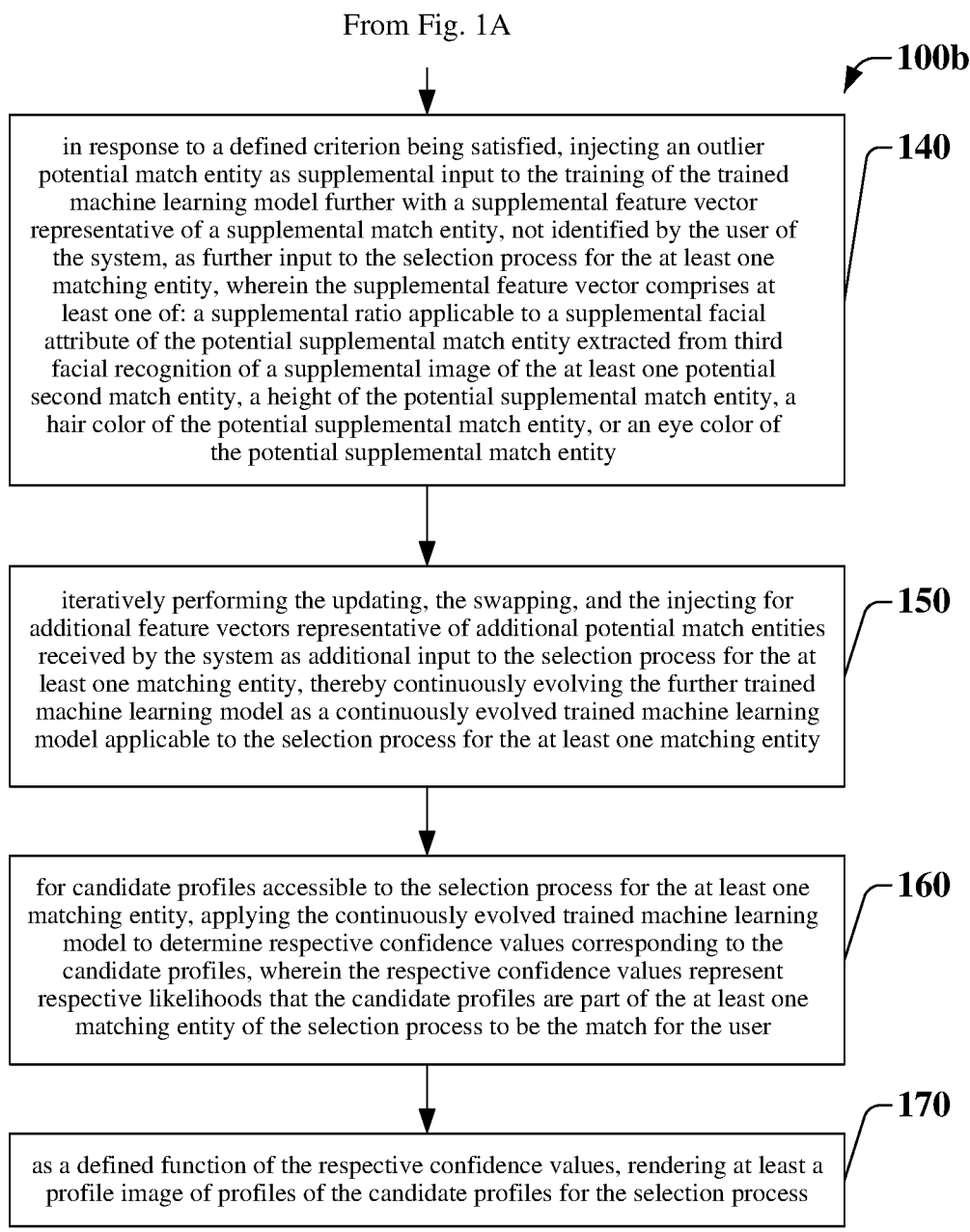

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In order to allow users of dating applications to quickly and accurately find potential match candidates that the users would choose to match with, Machine Learning can be used to predict, with a defined amount of confidence, potential match candidates that can be presented to the user to select or not select.

In some embodiments, a Machine Learning Model can be used for each user of a dating application, where each Machine Learning Model can be trained with a feature vector based on the physical attributes (such as nose width, distance between the eyes, and/or slant direction of the eyebrows, etc.) and/or the non-physical attributes (such as age and/or the text in a potential match candidate's profile) of potential match candidates selected and/or not selected by the user in the user's history of usage of the dating application.

In other embodiments, a Machine Learning Model can be used for each user of a dating application, where each Machine Learning Model can be trained with a feature vector based on the physical attributes and/or the non-physical attributes of potential match candidates selected and/or not selected by the user in the user's history of usage of one or more dating applications.

Using Machine Learning Models that can be trained can yield vended profiles that have a higher likelihood of being selected as a match, which can allow faster and more accurate matching with potential match candidates for users of dating applications.

In alternative embodiments, machine learning models can be trained to present potential match candidates that have a high likelihood of being selected by users of dating applications, where the machine learning models can be trained with one or more of the following (non-exhaustive) feature vectors: facial attributes of potential match candidates extracted from facial recognition, height of the potential match candidates, hair color of the potential match candidates, eye color of the potential match candidates, and/or sentiment of the "About Yourself" text in the potential match candidates' profiles as determined by Natural Language Processing.

In other embodiments, Machine Learning Models can continuously learn, adapt, and update by using a pair of machine learning models, where one already trained machine learning model can be in a foreground executing space and capable of predicting potential match candidates that meet a confidence criteria, and the second machine learning model can be in a background processing space actively being trained with more recent data.

In other example embodiments, after the second machine learning model has been trained with the more recent data, the second machine learning model that has been further trained can be swapped into the foreground execting space and the first machine learning model can be swapped into the background processing space to be further trained with new and/or more recent data (e.g., the user's current and/or recent activity on the dating app).

In some embodiments, the swapping of the machine learning model in the foreground executing space and the machine learning model in the background processing space can be performed continuously throughout the duration of usage of the dating application, where the duration of usage of the dating app can be the lifetime of the user's usage.

In alternative embodiments, the Macine Learning Models can use the collected feature vector data to predict and present profiles of potential match candidates that meet a confidence criteria, where the confidence criteria can be predetermined by the user or by the Machine Learning Model based on the user's previous activity on the dating app.

In other embodiments, if a profile or profiles of potential match candidate(s) in the vending queue do not meet the confidence criteria, the Machine Learning Models can vend potential match candidate profile(s) that have a lower confidence level than the confidence criteria, where the Machine Learning Models can use the user's actions in regard to the lower confidence profile(s) (e.g., whether or not the user selects one or more of the lower confidence profiles) to further train the machine learning model in the background processing space with additional information regarding the user's preferences.

In some example embodiments, when the Machine Learning Models identifies a potential match candidate profile or profiles that have a high confidence level, the Machine Learning Models can sort the matched profile(s) in an order of highest prediction confidence to lowest prediction confidence.

In alternative embodiments, the user can input/upload at least one or more of the following to train the Machine Learning Models with the user's preference(s) (e.g., physical attributes the user "likes"): picture of a potential match candidate's face, potential match candidate's birth date, potential match candidate's height, potential match candidate's eye color, and/or potential match candidate's hair color. The Machine Learning Models can then process the information input/uploaded by the user using facial recognition to determine landmark locations (i.e., x and y coordinates) of at least the potential match candidate's eyes, nose, mouth, and/or eyebrows. The Machine Learning Models can also determine at least the potential match candidate's face width and height.

In other embodiments, at least one of the following physical attributes can be used to train the Machine Learning Models to select and present high confidence profiles to the user: emotion portrayed in a potential match candidate's picture, a ratio of the face width of a potential match candidate compared with the height of the face of the potential match candidate, whether or not the potential match candidate has a beard and/or a mustache, whether or not the potential match candidate is smiling, whether or not the potential match candidate has an open mouth, the vertical and/or horizontal distance(s) of the potential match candidate's eyes, the x coordinate(s) of the potential match candidate's eyes (e.g., left eye and/or right eye), the y coordinate(s) of the potential match candidate's eyes (e.g., left eye and/or right eye), the distance between the potential match candidate's eyes, the slope from the potential match candidate's eye(s) to the nose, the nose width of the potential match candidate, the slope from the potential match candidate's eye(s) to the mouth, the potential match candidate's mouse width, the potential match candidate's mouth height, and/or whether the potential match candidate's eyebrows are slanted (e.g., slanted upward, slanted downward, or not slanted), where all of the above can be calculated using landmark vales extracted from facial recognition, and where the x and/or y coordinate(s) can be relative to the potential match candidate's face.

In some embodiments, the sentiment of the text in a potential match candidate's profile (e.g., text in the "About You" portion of the profile) can be used by the Machine Learning Models as a feature vector to train the Machine Learning Models, where the sentiment can be at least one of positive, negative, and/or neutral.

In other embodiments, the Machine Learning Models can obtain a random potential match candidate's profile based on the user's search criteria and then the trained Machine Learning Models can, using the collected feature vector data, predict whether or not the user would select (e.g., "like") the randomly obtained potential match candidate profile. If the Machine Learning Models determine the user likely would select the randomly selected potential match candidate's profile, based on the collected feature vector data, the Machine Learning Models can vend (e.g., present) the randomly obtained potential match candidate's profile to the user. If the Machine Learning Models determine the user likely would not select (e.g., not "like") the randomly selected potential match candidate's profile, based on the collected feature vector data, the Machine Learning Models can disregard (e.g., skip) the randomly obtained potential match candidate's profile and then obtain, based on the user's search criteria, a second randomly obtained potential match candidate's profile, where the Machine Learning Models can, using the collected feature vector data, predict whether or not the user would select (e.g., "like") the second randomly obtained potential match candidate profile. If the Machine Learning Models determine the user likely would select the second randomly selected potential match candidate's profile, based on the collected feature vector data, the Machine Learning Models can vend (e.g., present) the second randomly obtained potential match candidate's profile to the user. If the Machine Learning Models determine the user likely would not select (e.g., not "like") the second randomly selected potential match candidate's profile, based on the collected feature vector data, the Machine Learning Models can disregard (e.g., skip) the second randomly obtained potential match candidate's profile and then obtain a third randomly obtained potential match candidate's profile. This process can repeat.

In some embodiments, if all of the randomly obtained potential match candidate profiles in the queue are determined to not meet the user's desired confidence criteria, the Machine Learning Models can present one or more of the randomly obtained potential match candidate profiles in the queue in to the user, where the randomly obtained potential match candidate profiles in the queue that do not meet the confidence criteria can be presented to the user in an order of highest confidence to lowest confidence. In this way, the Machine Learning Models can be trained to better (e.g., more accurately and more quickly) predict attributes preferred by the user.

A person of ordinary skill in the art should understand that in the present application, 'user' can mean at least one user (e.g., one or more users).

Some embodiments can include an algorithm that comprises the following steps: (1) two machine learning models (machine learning model #1 and machine learning model #2) exist in a foreground execution space and a background processing space, respectively, within a processor, (2) check if machine learning model #2 (the model in the background processing space) is trained, (3a) if yes, move machine learning model #2 into the foreground execution space (and move machine learning model #1 into the background processing space) and recharacterize machine learning model #1 as machine learning model #2 (and vice versa), (3b) if no, do nothing and keep training machine learning model #2 in the background processing space, (4) machine learning model #1 is trained and predicting potential match candidate profiles that the user will select, (5) check if a predicted potential match candidate profile is above X % prediction confidence, (6a) if yes, check if user likes the predicted potential match candidate profile, (6b) if no, check if counter is >Y, (7a) if user does like the predicted potential match candidate profile, show profile and train machine learning model #2 (in the background processing space) with feature vector record when enough data is stored, (7b) if the user does not like the predicted potential match candidate profile, train machine learning model #2 (in the background processing space) with feature vector record when enough data is stored, (8a) if counter is >Y, show the predicted potential match candidate profile, (8b) if counter is not >Y, get profile counter is incremented by one, (9) machine learning model #1 is trained and continues to predict potential match candidate profiles (that the user would select), and process repeats continuously.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

Addressing the above and other issues associated with vending high confidence predicted profiles and increasing the likelihood of users "matching" with a vended profile for dating applications using continuously-learning Machine Learning models that can be trained for each user with physical and facial attributes calculated from facial recognition, "about you" text analyzed by Natural Language Understanding, and other preferences, various embodiments disclosed herein can, by training a machine learning model with at least one first feature vector representative of at least one potential first match entity identified by a user as input to a selection process for at least one matching entity to be a match for the user; updating the trained machine learning model by training the machine learning model further with at least one second feature vector representative of at least one potential second match entity identified by the user as further input to the selection process for the at least one matching entity; in response to the updating of the trained machine learning model, swapping the trained machine learning model out of a foreground execution space, and a further trained machine learning model into the foreground execution space; in response to a defined criterion being satisfied, injecting an outlier potential match entity as a supplemental input to the training of the trained machine learning model further with a supplemental feature vector representative of a supplemental match entity, not identified by the user, as further input to the selection process for the at least one matching entity; and iteratively performing the updating, the swapping, and the injecting for additional feature vectors representative of additional potential match entities received as additional input to the selection process for the at least one matching entity, vend high confidence predicted profiles and increase the likelihood of users "matching" with a vended profile for dating applications.

In this regard, and now referring to FIGS. 1A and 1B, an example flowchart of a method for training a machine learning model to vend profiles with a high likelihood of matching with a user is illustrated, in accordance with aspects of the subject disclosure. FIG. 1A illustrates steps 110 through 130, where step 130 is followed by step 140 (illustrated in FIG. 1B). At 110, method 100 can comprise training, by a system comprising a processor, a machine learning model with at least one first feature vector representative of at least one potential first match entity identified by a user of the system as input to a selection process for at least one matching entity to be a match for the user, wherein the at least one first feature vector comprises at least one of: at least one first ratio applicable to at least one facial first attribute of the at least one potential first match entity extracted from first facial recognition of at least one first image of the at least one potential first match entity, at least one first height of the at least one potential first match entity, at least one first hair color of the at least one potential first match entity, at least one first eye color of the at least one potential first match entity, or at least one first bias attributable to the user of the system applicable to the selection process for the at least one matching entity determined by natural language processing of first textual content attributable to the at least one potential first match entity, resulting in a trained machine learning model, wherein the trained machine learning model is in a foreground execution space of the system, and wherein the trained machine learning model is further trained in a background processing space of the system while the trained machine learning model is usable for the selection process for the at least one matching entity in the foreground execution space. At 120, method 100 can comprise updating the trained machine learning model comprising training the trained machine learning model further with at least one second feature vector representative of at least one potential second match entity identified by the user of the system as further input to the selection process for the at least one matching entity, wherein the at least one second feature vector comprises at least one of: at least one second ratio applicable to at least one second facial attribute of the at least one potential second match entity extracted from second facial recognition of at least one second image of the at least one potential second match entity, at least one second height of the at least one potential second match entity, at least one second hair color of the at least one potential second match entity, at least one second eye color of the at least one potential second match entity, or at least one second bias attributable to the user of the system further applicable to the selection process for the at least one matching entity determined by natural language processing of second textual content attributable to the user of the system, resulting in a further trained machine learning model. At 130, method 100 can comprise in response to the updating of the trained machine learning model, swapping the trained machine learning model out of the foreground execution space, and swapping the further trained machine learning model into the foreground execution space, resulting in the untrained machine learning model being in the foreground execution space and the trained machine learning model being in the background processing space. FIG. 1B illustrates steps 140 through 170, where step 140 continues from step 130 (illustrated in FIG. 1A). At 140, method 100 can comprise in response to a defined criterion being satisfied, injecting an outlier potential match entity as supplemental input to the training of the trained machine learning model further with a supplemental feature vector representative of a supplemental match entity, not identified by the user of the system, as further input to the selection process for the at least one matching entity, wherein the supplemental feature vector comprises at least one of: a supplemental ratio applicable to a supplemental facial attribute of the potential supplemental match entity extracted from third facial recognition of a supplemental image of the at least one potential second match entity, a height of the potential supplemental match entity, a hair color of the potential supplemental match entity, or an eye color of the potential supplemental match entity. At 150, method 100 can comprise iteratively performing the updating, the swapping, and the injecting for additional feature vectors representative of additional potential match entities received by the system as additional input to the selection process for the at least one matching entity, thereby continuously evolving the further trained machine learning model as a continuously evolved trained machine learning model applicable to the selection process for the at least one matching entity. At 160, method 100 can comprise for candidate profiles accessible to the selection process for the at least one matching entity, applying the continuously evolved trained machine learning model to determine respective confidence values corresponding to the candidate profiles, wherein the respective confidence values represent respective likelihoods that the candidate profiles are part of the at least one matching entity of the selection process to be the match for the user. At 170, method 100 can comprise as a defined function of the respective confidence values, rendering at least a profile image of profiles of the candidate profiles for the selection process. For the avoidance of doubt, the at least one first or second feature vector can comprise one first or second feature vector or a plurality of first or second feature vectors. In addition, it is noted that any embodiment described herein with reference to at least one potential first or second match entity can apply to one or more potential first or second match entities, and similarly, any embodiment described herein with reference to at least one first or second ratio can apply to one or more first or second ratios. Further, any embodiment described herein with reference to at least one facial first or second attribute can apply to one or more facial first or second attributes, and similarly, any embodiment described herein with reference to at least one first or second bias can apply to one or more first or second biases.

Optionally, the defined function at block 170 of method 100 can select a top candidate profile of the candidate profiles having a highest confidence value of the respective confidence values.

In some embodiments, the defined function at block 170 of method 100 can select a top number of candidate profiles of the candidate profiles having a top number of highest confidence values of the respective confidence values.

In alternative embodiments, the defined function at block 170 of method 100 can select a top candidate profile of the candidate profiles having a confidence value between a highest confidence value of the respective confidence values and a lowest confidence value of the respective confidence values.

In other example embodiments, the defined function at block 170 of method 100 can select a bottom candidate profile of the candidate profiles having a lowest confidence value of the respective confidence values.

In some embodiments, the defined function at block 170 of method 100 can sort the candidate profiles in an order of a highest confidence value to a lowest confidence value.

In other embodiments, at blocks 110 and 120, the at least one first ratio and the at least one second ratio can comprise at least one of: a first ratio of a first width of a face of the at least one potential match entity and at least one of: a first height of the face of the at least one potential match entity, a vertical distance of eyes of the face of the at least one potential match entity, a horizontal distance of the eyes of the face of the at least one potential match entity, a horizontal positioning of the eyes of the face of the at least one potential match entity, a vertical positioning of the eyes of the face of the at least one potential match entity, a distance between the eyes of the face of the at least one potential match entity, a slant direction of eyebrows of the face of the at least one potential match entity, a second width of a nose of the face of the at least one potential match entity, a second height of the nose of the face of the at least one potential match entity, a third width of a mouth of the face of the at least one potential match entity, a third height of the mouth of the face of the at least one potential match entity, a fourth width of a forehead of the face of the at least one potential match entity, a fourth height of the forehead of the face of the at least one potential match entity, a fifth width of cheekbones of the face of the at least one potential match entity, a fifth height of the cheekbones of the face of the at least one potential match entity, a first slope from the eyes to the nose of the face of the at least one potential match entity, or a second slope from the eyes to the mouth of the face of the at least one potential match entity, a second ratio of the first width of the face of the at least one potential match entity and the vertical distance of the eyes of the face of the at least one potential match entity, a third ratio of the first height of the face of the at least one potential match entity and at least one of: the vertical distance of the eyes of the face of the at least one potential match entity, the horizontal distance of the eyes of the face of the at least one potential match entity, the horizontal positioning of the eyes of the face of the at least one potential match entity, the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fourth ratio of the vertical distance of the eyes of the face of the at least one potential match entity and at least one of: the horizontal distance of the eyes of the face of the at least one potential match entity, the horizontal positioning of the eyes of the face of the at least one potential match entity, the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fifth ratio of the horizontal distance of the eyes of the face of the at least one potential match entity and at least one of: the horizontal positioning of the eyes of the face of the at least one potential match entity, the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a sixth ratio of the horizontal positioning of the eyes of the face of the at least one potential match entity and at least one of: the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a seventh ratio of the vertical positioning of the eyes of the face of the at least one potential match entity and at least one of: the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, an eighth ratio of the distance between the eyes of the face of the at least one potential match entity and at least one of: the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a ninth ratio of the slant direction of the eyebrows of the face of the at least one potential match entity and at least one of: the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a tenth ratio of the second width of the nose of the face of the at least one potential match entity and at least one of: the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, an eleventh ratio of the second height of the nose of the face of the at least one potential match entity and at least one of: the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a twelfth ratio of the third width of the mouth of the face of the at least one potential match entity and at least one of: the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a thirteenth ratio of the third height of the mouth of the face of the at least one potential match entity and at least one of: the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fourteenth ratio of the fourth width of the forehead of the face of the at least one potential match entity and at least one of: the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fifteenth ratio of the fourth height of the forehead of the face of the at least one potential match entity and at least one of: the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a sixteenth ratio of the fifth width of the cheekbones of the face of the at least one potential match entity and at least one of: the fifth height of the cheekbones of the face of the at least one potential match entity, wherein the second ratio is different from the first ratio, the first slope from the eyes to the nose of the face of the at least one potential match entity, or the second slope from the eyes to the mouth of the face of the at least one potential match entity, a seventeenth ratio of the fifth height of the cheekbones of the face of the at least one potential match entity and at least one of: the first slope from the eyes to the nose of the face of the at least one potential match entity, or the second slope from the eyes to the mouth of the face of the at least one potential match entity, or an eighteenth ratio of the first slope from the eyes to the nose of the face of the at least one potential match entity and the second slope from the eyes to the mouth of the face of the at least one potential match entity.

In alternative embodiments, at block 120, the updating the trained machine learning can comprise predicting, based on the continuously evolved trained machine learning model, at least one candidate profile that will be part of the at least one matching entity of the selection process to be the match for the user.

In another example embodiment, at block 130, the swapping the trained machine learning model and the further trained machine model can be performed for a duration of usage of the trained machine learning model.

Figure 2:
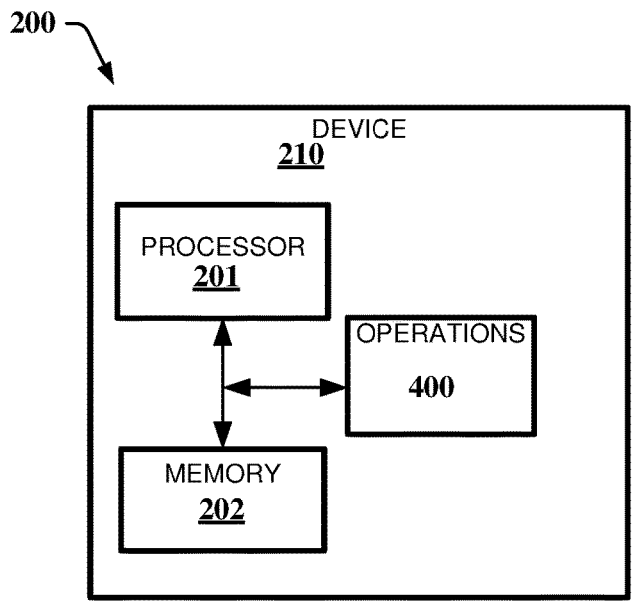
FIG. 2 illustrates a block diagram of an example device that comprises a processor and a memory that stores executable instructions that, when executed by the processor, facilitate performance of the operations of training a machine learning model to vend profiles with a high likelihood of matching with a user, in accordance with various example embodiments.

In this regard, and now referring to FIG. 2, a non-limiting, example block diagram 200 is shown of a device 210 that vends high confidence predicted profiles and increases the likelihood of users "matching" with a vended profile for dating applications, in accordance with various example embodiments. The device 210 can comprise a processor 201, and a memory 202 that stores executable instructions that, when executed by processor 202, facilitate performance of operations 400 of training a machine learning model to vend profiles with a high likelihood of matching with a user, in accordance with various example embodiments. Processor 201 and memory 202 can be communicatively coupled to facilitate performance of operations 400 (e.g., training a machine learning model to vend profiles with a high likelihood of matching with a user).

Figure 3:
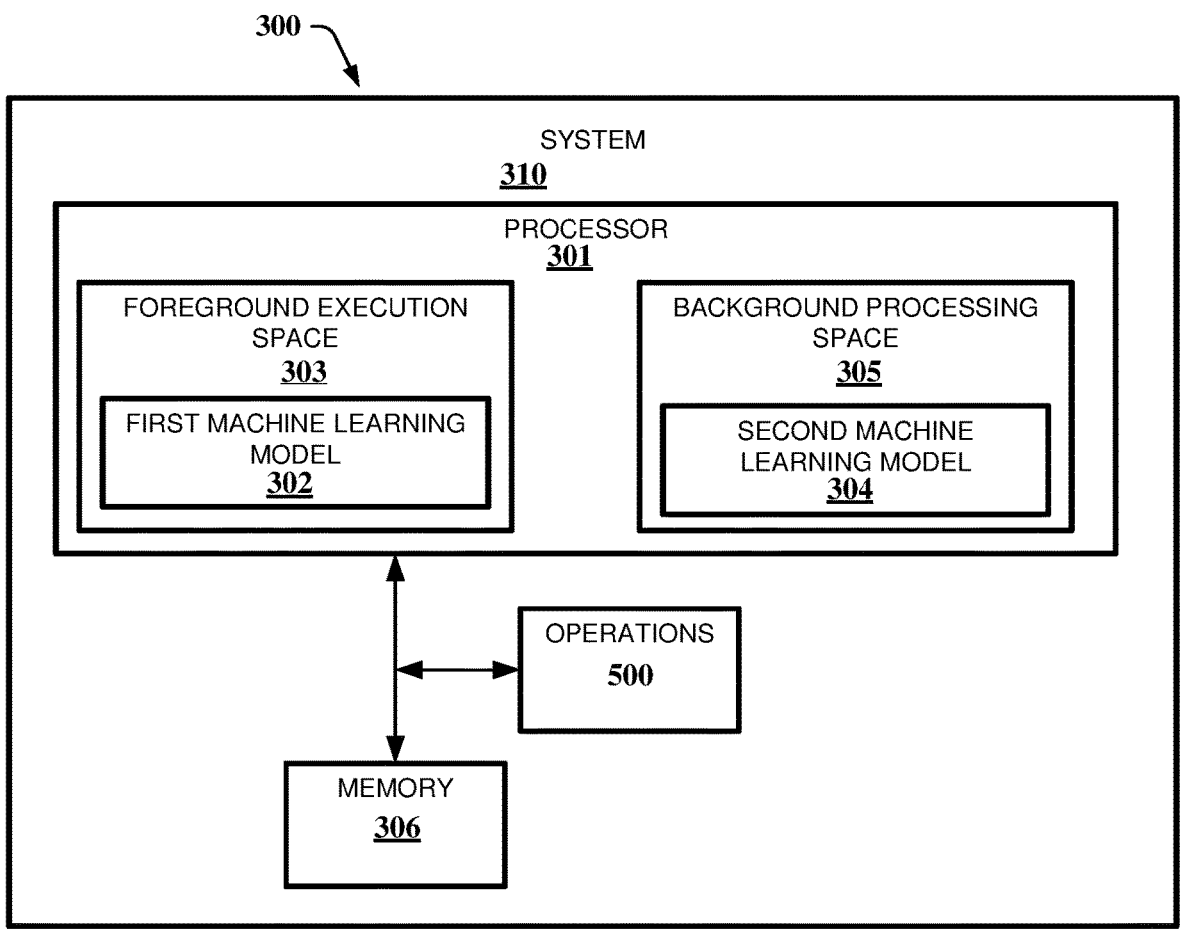
FIG. 3 illustrates a block diagram of an example system comprising a processor comprising a first machine learning model in a foreground execution space and a second machine learning model in a background processing space, and a memory that stores executable instructions that, when executed by the processor, facilitate performance of the operations of training a machine learning model to vend profiles with a high likelihood of matching with a user, in accordance with various example embodiments.

Now referring to FIG. 3, a block diagram 300 of an example system 310 comprising at least one processor 301 comprising a first machine learning model 302 in a foreground execution space 303 and a second machine learning model 304 in a background processing space 305, and at least one memory 306 that stores executable instructions that, when executed by the processor 301, facilitate performance of operations 500 of training a machine learning model to vend profiles with a high likelihood of matching with a user, in accordance with various example embodiments.

Now referring to FIG. 4, a sequence diagram of example operations 400 of device 210 illustrated in FIG. 2, in accordance with various example embodiments. At 410, operations 400 can comprise training, by the device, a machine learning model with first feature vectors representative of potential first match entities identified by at least one user of the device as inputs to a selection process for matching entities to be matches for the at least one user of the device, the first feature vectors respectively comprising: first ratios applicable to facial first attributes of the potential first match entities extracted from first facial recognition of first images of the potential first match entities, first heights of the potential first match entities, first hair colors of the potential first match entities, first eye colors of the potential first match entities, or first biases attributable to the at least one user of the device applicable to the selection process for the matching entities determined by natural language processing of first textual content attributable to the potential first match entities, resulting in a trained machine learning model, wherein the trained machine learning model is operable in a foreground execution space of the device, and wherein the trained machine learning model is further trained in a background processing space of the device while the trained machine learning model is usable for the selection process for the matching entities in the foreground execution space. At 420, operations 400 can comprise updating the trained machine learning model comprising training the trained machine learning model further with second feature vectors representative of potential second match entities identified by the at least one user of the device as further inputs to the selection process for the matching entities, the second feature vectors comprising: second ratios applicable to second facial attributes of the potential second match entities extracted from second facial recognition of second images of the potential second match entities, second heights of the potential second match entities, second hair colors of the potential second match entities, second eye colors of the potential second match entities, or second biases attributable to the at least one user of the device further applicable to the selection process for the matching entities determined by natural language processing of second textual content attributable to the at least one user of the device, resulting in a further trained machine learning model, wherein the updating the trained machine learning model comprises: swapping the trained machine learning model out of the foreground execution space, and swapping the further trained machine learning model into the foreground execution space, resulting in the untrained machine learning model being in the foreground execution space and the trained machine learning program being in the background processing space, and iteratively performing the updating and the swapping for additional feature vectors representative of additional potential match entities received by the device as additional inputs to the selection process for the matching entities, thereby continuously evolving the further trained machine learning model as a continuously evolved trained machine learning model applicable to the selection process for the matching entities. At 430, operations 400 can comprise in response to a defined criterion being satisfied, injecting outlier potential match entities as supplemental inputs to the training of the trained machine learning model further with supplemental feature vectors representative of supplemental match entities, not identified by the at least one user of the device, as further inputs to the selection process for the matching entities, the supplemental feature vectors comprising: supplemental ratios applicable to supplemental facial attributes of the potential supplemental match entities extracted from third facial recognition of supplemental images of the potential second match entities, heights of the potential supplemental match entities, hair colors of the potential supplemental match entities, or eye colors of the potential supplemental match entities. At 440, operations 400 can comprise for candidate profiles accessible to the selection process for the matching entities, applying the continuously evolved trained machine learning model to determine respective confidence values corresponding to the candidate profiles, wherein the respective confidence values represent respective likelihoods that the candidate profiles are part of the matching entities of the selection process to be the matches for the at least one user. At 450, operations 400 can comprise as a defined function of the respective confidence values, rendering at least profile images of profiles of the candidate profiles for the selection process.

Optionally, the defined function at block 450 of operations 400 can select a top candidate profile of the candidate profiles having a highest confidence value of the respective confidence values.

In another example embodiment, the defined function at block 450 of operations 400 can select a top number of candidate profiles of the candidate profiles having the top number of highest confidence values of the respective confidence values.

In other embodiments, the defined function at block 450 of operations 400 can select a top candidate profile of the candidate profiles having a confidence value between a highest confidence value of the respective confidence values and a lowest confidence value of the respective confidence values.

In alternative embodiments, the defined function at block 450 of operations 400 can select a bottom candidate profile of the candidate profiles having a lowest confidence value of the respective confidence values In other embodiments, at blocks 410 and 420, the first ratios and the second ratios can comprise at least one of: a first ratio of a first width of a face of the at least one potential match entity and at least one of: a first height of the face of the at least one potential match entity, a vertical distance of eyes of the face of the at least one potential match entity, a horizontal distance of the eyes of the face of the at least one potential match entity, a horizontal positioning of the eyes of the face of the at least one potential match entity, a vertical positioning of the eyes of the face of the at least one potential match entity, a distance between the eyes of the face of the at least one potential match entity, a slant direction of eyebrows of the face of the at least one potential match entity, a second width of a nose of the face of the at least one potential match entity, a second height of the nose of the face of the at least one potential match entity, a third width of a mouth of the face of the at least one potential match entity, a third height of the mouth of the face of the at least one potential match entity, a fourth width of a forehead of the face of the at least one potential match entity, a fourth height of the forehead of the face of the at least one potential match entity, a fifth width of cheekbones of the face of the at least one potential match entity, a fifth height of the cheekbones of the face of the at least one potential match entity, a first slope from the eyes to the nose of the face of the at least one potential match entity, or a second slope from the eyes to the mouth of the face of the at least one potential match entity, a second ratio of the first width of the face of the at least one potential match entity and the vertical distance of the eyes of the face of the at least one potential match entity, a third ratio of the first height of the face of the at least one potential match entity and at least one of: the vertical distance of the eyes of the face of the at least one potential match entity, the horizontal distance of the eyes of the face of the at least one potential match entity, the horizontal positioning of the eyes of the face of the at least one potential match entity, the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fourth ratio of the vertical distance of the eyes of the face of the at least one potential match entity and at least one of: the horizontal distance of the eyes of the face of the at least one potential match entity, the horizontal positioning of the eyes of the face of the at least one potential match entity, the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fifth ratio of the horizontal distance of the eyes of the face of the at least one potential match entity and at least one of: the horizontal positioning of the eyes of the face of the at least one potential match entity, the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a sixth ratio of the horizontal positioning of the eyes of the face of the at least one potential match entity and at least one of: the vertical positioning of the eyes of the face of the at least one potential match entity, the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a seventh ratio of the vertical positioning of the eyes of the face of the at least one potential match entity and at least one of: the distance between the eyes of the face of the at least one potential match entity, the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, an eighth ratio of the distance between the eyes of the face of the at least one potential match entity and at least one of: the slant direction of the eyebrows of the face of the at least one potential match entity, the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a ninth ratio of the slant direction of the eyebrows of the face of the at least one potential match entity and at least one of: the second width of the nose of the face of the at least one potential match entity, the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a tenth ratio of the second width of the nose of the face of the at least one potential match entity and at least one of: the second height of the nose of the face of the at least one potential match entity, the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, an eleventh ratio of the second height of the nose of the face of the at least one potential match entity and at least one of: the third width of the mouth of the face of the at least one potential match entity, the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a twelfth ratio of the third width of the mouth of the face of the at least one potential match entity and at least one of: the third height of the mouth of the face of the at least one potential match entity, the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a thirteenth ratio of the third height of the mouth of the face of the at least one potential match entity and at least one of: the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fourteenth ratio of the fourth width of the forehead of the face of the at least one potential match entity and at least one of: the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fifteenth ratio of the fourth height of the forehead of the face of the at least one potential match entity and at least one of: the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a sixteenth ratio of the fifth width of the cheekbones of the face of the at least one potential match entity and at least one of: the fifth height of the cheekbones of the face of the at least one potential match entity, wherein the second ratio is different from the first ratio, the first slope from the eyes to the nose of the face of the at least one potential match entity, or the second slope from the eyes to the mouth of the face of the at least one potential match entity, a seventeenth ratio of the fifth height of the cheekbones of the face of the at least one potential match entity and at least one of: the first slope from the eyes to the nose of the face of the at least one potential match entity, or the second slope from the eyes to the mouth of the face of the at least one potential match entity, or an eighteenth ratio of the first slope from the eyes to the nose of the face of the at least one potential match entity and the second slope from the eyes to the mouth of the face of the at least one potential match entity.

In alternative embodiments, at block 420, the updating the trained machine learning model can further comprise predicting, based on the continuously evolved trained machine learning model, a candidate profile of the candidate profiles that will have a highest confidence value of the respective confidence values, resulting in a predicted profile.

In another example embodiment, at block 420, the swapping the trained machine learning model and the further trained machine model can be performed for a duration of usage of the trained machine learning model.

In other embodiments, the operations 400 can further comprise, at block 460, in response to the candidate profiles being determined not to satisfy the defined criterion, rendering at least profile images of profiles of the candidate profiles for the selection process having a lower confidence value than the predicted profile.

In alternative example embodiments, the defined function at block 450 of operations 400 can sort the candidate profiles in an order of a highest confidence value to a lowest confidence value.

Now referring to FIG. 5, a sequence diagram of example operations 500 of system 310 illustrated in FIG. 3, in accordance with various example embodiments. At 510, operations 500 can comprise training, by the system, the first and second machine learning models with at least one first feature vector representative of at least one potential first match entity identified by a user of the system as input to a selection process for at least one matching entity to be a match for the user, the at least one first feature vector comprising at least one of: at least one first ratio applicable to at least one facial first attribute of the at least one potential first match entity extracted from first facial recognition of at least one first image of the at least one potential first match entity, at least one first height of the at least one potential first match entity, at least one first hair color of the at least one potential first match entity, at least one first eye color of the at least one potential first match entity, or at least one first bias attributable to the user of the system applicable to the selection process for the at least one matching entity determined by natural language processing of first textual content attributable to the at least one potential first match entity, resulting in a trained first machine learning model, wherein the second machine learning model is further trained while the trained first machine learning model is usable for the selection process for the at least one matching entity in the foreground execution space, resulting in a trained second machine learning model. At 520, operations 500 can comprise updating the trained second machine learning model comprising training the trained second machine learning model further with at least one second feature vector representative of at least one potential second match entity identified by the user of the system as further input to the selection process for the at least one matching entity, the at least one second feature vector comprising at least one of: at least one second ratio applicable to at least one second facial attribute of the at least one potential second match entity extracted from second facial recognition of at least one second image of the at least one potential second match entity, at least one second height of the at least one potential second match entity, at least one second hair color of the at least one potential second match entity, at least one second eye color of the at least one potential second match entity, or at least one second bias attributable to the user of the system further applicable to the selection process for the at least one matching entity determined by natural language processing of second textual content attributable to the user of the system, resulting in a further trained second machine learning model. At 530, operations 500 can comprise in response to the updating of the trained second machine learning model, swapping the trained first machine learning model out of the foreground execution space, and swapping the further trained second machine learning model into the foreground execution space, resulting in the further trained second machine learning model being in the foreground execution space and the trained first machine learning model being in the background processing space. At 540, operations 500 can comprise in response to a defined criterion being satisfied, injecting an outlier potential match entity as supplemental input to the training of the trained first machine learning model and the further trained second machine learning model further with a supplemental feature vector representative of a supplemental match entity, not identified by the user of the system, as further input to the selection process for the at least one matching entity, the supplemental feature vector comprising at least one of: a supplemental ratio applicable to a supplemental facial attribute of the potential supplemental match entity extracted from third facial recognition of a supplemental image of the at least one potential second match entity, a height of the potential supplemental match entity, a hair color of the potential supplemental match entity, or an eye color of the potential supplemental match entity. At 550, operations 500 can comprise iteratively performing the updating, the swapping, and the injecting for additional feature vectors representative of additional potential match entities received by the system as additional input to the selection process for the at least one matching entity, thereby continuously evolving the trained first machine learning model and the further trained second machine learning model as a continuously evolved trained machine learning model applicable to the selection process for the at least one matching entity. At 560, operations 500 can comprise for candidate profiles accessible to the selection process for the at least one matching entity, applying the continuously evolved trained machine learning model to determine respective confidence values corresponding to the candidate profiles, wherein the respective confidence values represent respective likelihoods that the candidate profiles are part of the at least one matching entity of the selection process to be the match for the user.

At 570, operations 500 can comprise as a defined function of the respective confidence values, rendering at least a profile image of profiles of the candidate profiles for the selection process.

Figure 6:
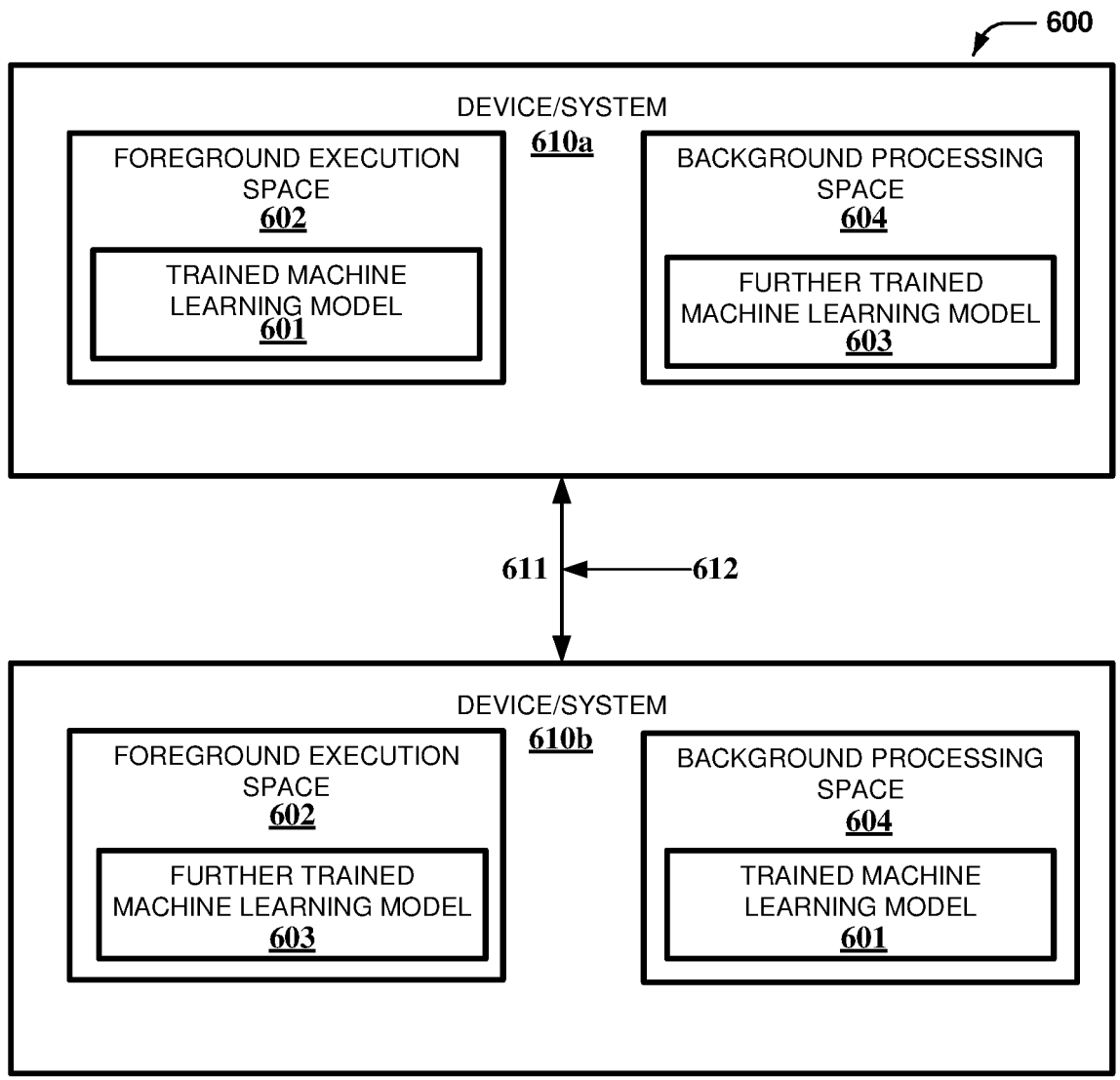
FIG. 6 illustrates an example block diagram of the operation of swapping of a trained machine learning model out of a foreground executing space into a background processing space, and a further trained machine learning model out of the background processing space into the foreground execution space of the device illustrated in FIG. 2 and the system illustrated in FIG. 3, in accordance with various example embodiments.

FIG. 6 illustrates an example block diagram 600 of the swapping 611 a trained machine learning model 601 out of a foreground execution space 602 into a background processing space 604, and a further trained machine learning model 603 out of the background processing space 604 into the foreground execution space 602 of the device 200 illustrated in FIG. 2 and/or the system 300 illustrated in FIG. 3, in accordance with various example embodiments. Device/System 610*a* can comprise the trained machine learning model 601 in the foreground execution space 602 and the further trained machine learning model 603 in the background processing space 604. Device/System 610*a* can be updated 612 with new and/or recent data and/or user activity regarding preferences for selecting potential match candidates. After the Device/System 610*a* is updated 612, the trained machine learning model 601 and the further trained machine learning model 603 can be swapped 611, whereby the resulting positions of the trained machine learning model 601 and the further trained machine learning model 603 in Device/System 610*b* after swapping 611 are the further trained machine learning model 603 is in the foreground execution space 602 and the trained machine learning model 601 is in the background execution space 604. After swapping 611, the trained machine learning model 601 is further trained (not pictured) whilst in the background processing space 604. This process can be repeated continuously throughout the duration of the user's usage of the dating app. It should be noted that the trained machine learning model 601 is analogous to the first machine learning model in FIG. 3 and the further trained machine learning model 603 is analogous to the second machine learning model in FIG. 3.

In some embodiments, the Device/System 610*a* can be updated 612 with new and/or recent data and/or user activity regarding the confidence criteria. In other embodiments, the Device/System 610*a* can be updated 612 with new and/or recent data and/or user activity comprising an outlier potential match candidate profile (not pictured) not previously selected by the user which does not meet the confidence criteria.

Figure 7:
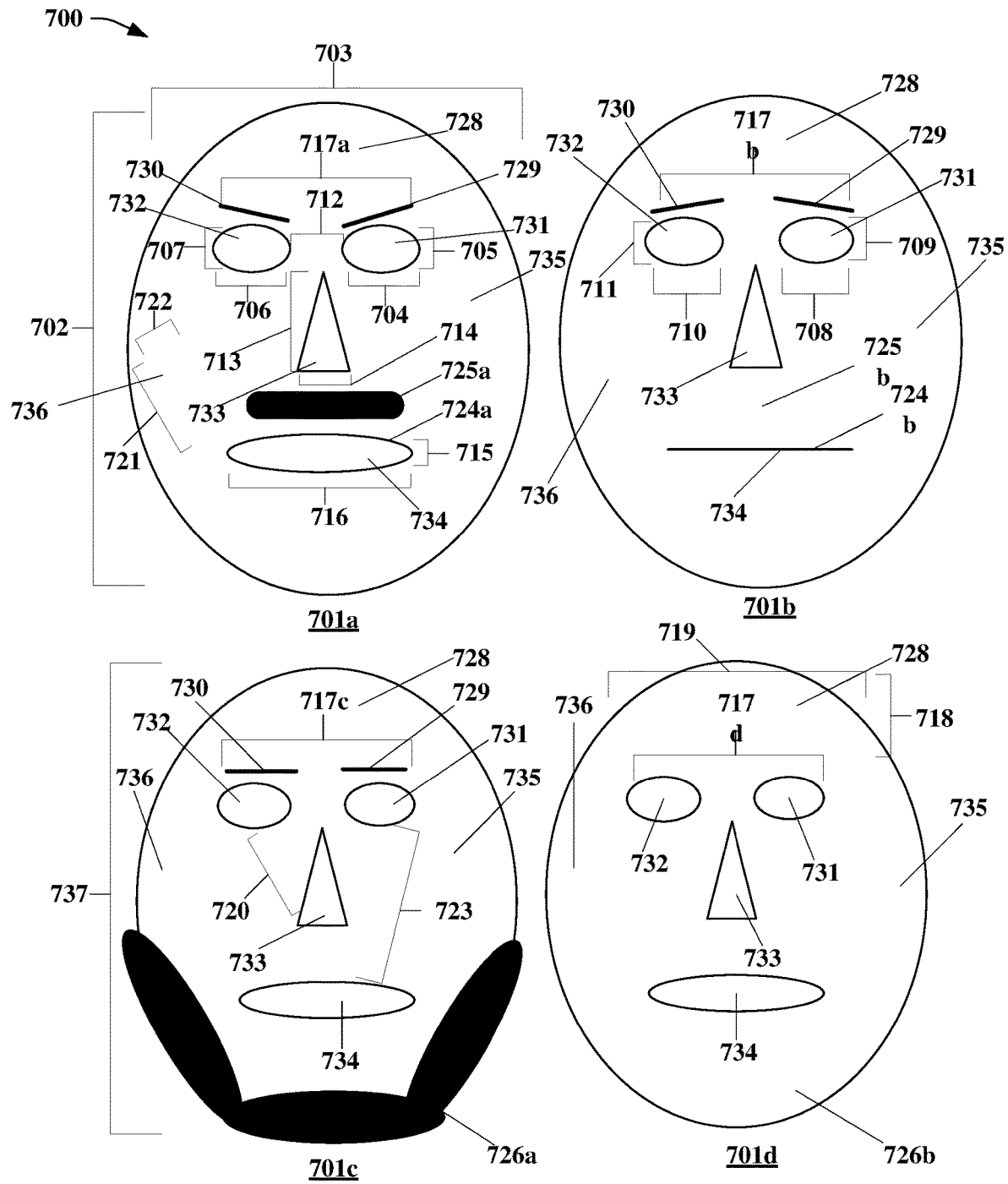
FIG. 7 illustrates a block diagram of the facial attributes of potential match entities that can be considered during the selection process, in accordance with various example embodiments.

FIG. 7 illustrates a block diagram 700 of the facial attributes 701 of potential match entities (not pictured) that can be considered during the selection process (not pictured), in accordance with various example embodiments. Facial attributes 701(*a*) illustrates the following facial attributes 701 that can be considered during the selection process: a face of a potential match entity comprising a forehead 728, a left eyebrow 729, a right eyebrow 730, a left eye 731, a right eye 732, a nose 733, a mouth 734, a left cheekbone 735, and a right cheekbone 736, which can be measured using facial recognition to determine a height of the face 702, a width of the face 703, a horizontal distance of the left eye 704, a vertical distance of the left eye 705, a horizontal distance of the right eye 706, a vertical distance of the right eye 707, a distance between the eyes 712, a height of the nose 713, a width of the nose 714, a height of the mouth 715, a width of the mouth 716, a downward slant position of the eyebrows 717*a*, a height of the cheekbone(s) 721, a width of the cheekbone(s) 722, an open mouth 724*a*, and/or a presence of a mustache 725*a*.

Facial attributes 701(*b*) illustrates the following facial attributes 701 that can be considered during the selection process: a face of a potential match entity comprising a forehead 728, a left eyebrow 729, a right eyebrow 730, a left eye 731, a right eye 732, a nose 733, a mouth 734, a left cheekbone 735, and a right cheekbone 736, which can be measured using facial recognition to determine the x coordinates of the left eye 708, the y coordinates of the left eye 709, the x coordinates of the right eye 710, the y coordinates of the right eye 711, an upward slant position of the eyebrows 717b, a closed mouth 724b, and/or the absence of a mustache 725b. It should be noted that the x and y coordinates of the eyes are in relation to the face of the potential match candidate.

Facial attributes 701(c) illustrates the following facial attributes 701 that can be considered during the selection process: a face of a potential match entity comprising a forehead 728, a left eyebrow 729, a right eyebrow 730, a left eye 731, a right eye 732, a nose 733, a mouth 734, a left cheekbone 735, and a right cheekbone 736, which can be measured using facial recognition to determine a horizontal position of the eyebrows 717c, a slope from the eyes to the nose 720, a slope from the eyes to the mouth 723, the presence of a beard 726a, and an emotion of the face 737 where the emotion of the face 737 is determined by identifying the locations and/or shapes of the forehead 728, the left eyebrow 729, the right eyebrow 730, the left eye 731, the right eye 732, the nose, 733, the mouth 734, the left cheekbone 735, the right cheekbone 736, and/or whether the mouth 734 is an open mouth 724a or a closed mouth 724b. Possible emotions can include: happiness, sadness, anger, fear, surprise, disgust, boredom, grief, and/or interest (not an exhaustive list).

Facial attributes 701(d) illustrates the following facial attributes 701 that can be considered during the selection process: a face of a potential match entity comprising a forehead 728, a left eyebrow 729, a right eyebrow 730, a left eye 731, a right eye 732, a nose 733, a mouth 734, a left cheekbone 735, and a right cheekbone 736, which can be measured using facial recognition to determine a height of the forehead 718, a width of the forehead 719, the absence of eyebrows 717d, and/or the absence of a beard 726b.

It should be noted that one or more of the facial features 701 can be considered during the selection process of potential match candidate profiles. Further, any combination of the facial features 701 illustrated in facial features 701(a), facial features 701(b), facial features 701(c), and/or facial features 701(d) can be considered when selecting potential match candidate profiles. The machine learning models (not pictured) can use any combination of the facial features (including using all of the facial features illustrated in facial features 701(a)—facial features 701(d) to determine whether or not a potential match candidate profile meets (or does not meet) the user's confidence criteria.

Figure 8:
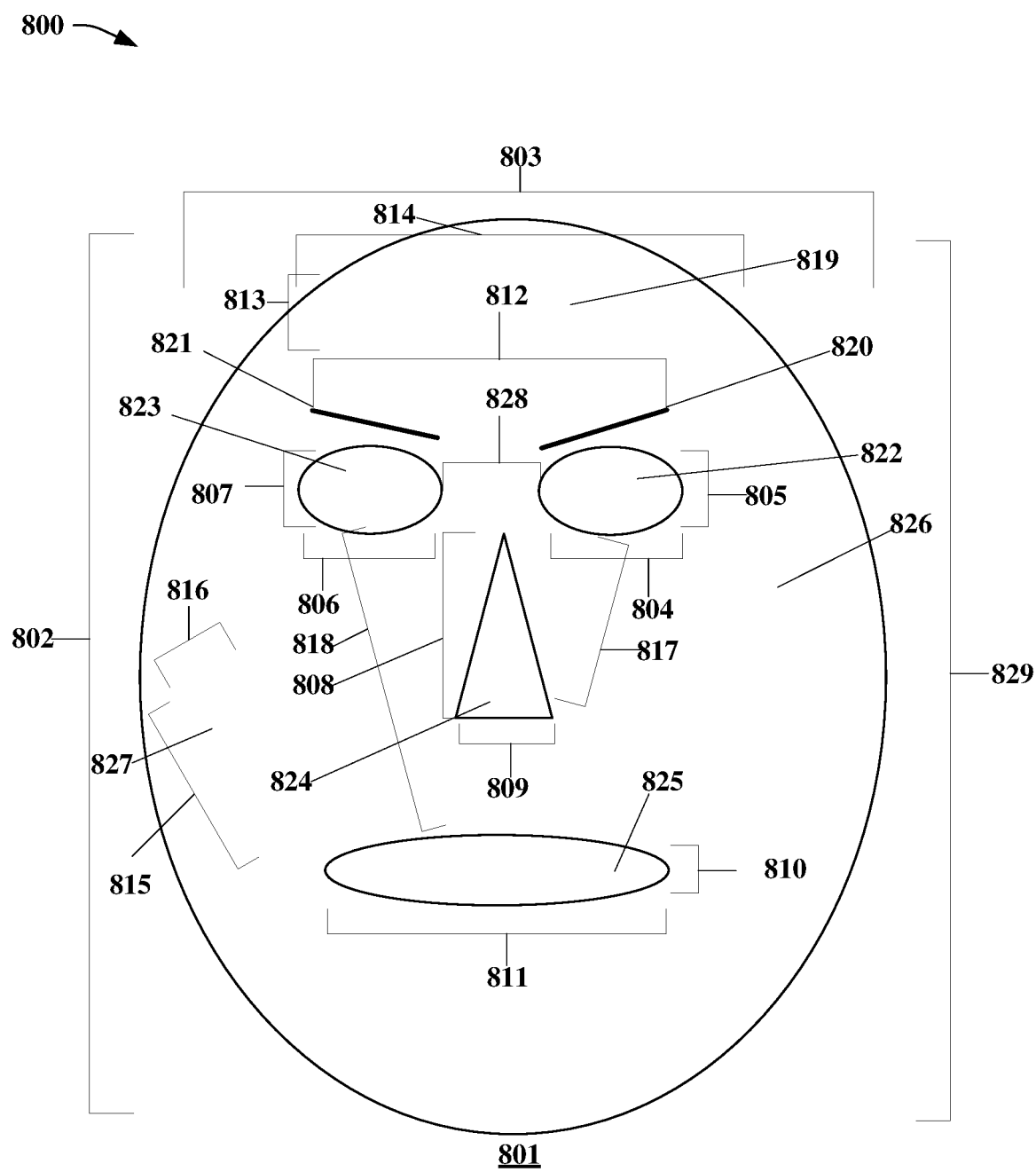
FIG. 8 illustrates a block diagram of the ratios of the facial attributes of potential match entities that can be considered when training the machine learning model, in accordance with various example embodiments.

FIG. 8 illustrates a block diagram 800 of the ratios 829 of the facial attributes 801 of potential match entities (not pictured) that can be considered when training the machine learning model (not pictured) and/or selecting potential match candidate profiles (not pictured) based on user preferences, in accordance with various example embodiments. One or more of the following facial attributes 801 can be considered and/or used by the machine learning models (not pictured) to form one or more ratios 829 to determine whether a potential match candidate profile (not pictured) would be selected by the user: a ratio of any one of the following facial features 801 compared with one or more of the remaining facial features 801: a height of the face 802, a width of the face 803, a horizontal distance of the left eye 804, a vertical distance of the left eye 805, a horizontal distance of the right eye 806, a vertical distance of the right eye 807, a height of the nose 808, a width of the nose 809, a height of the mouth 810, a width of the mouth 811, a slant position of the eyebrows 812 (where facial features 801 illustrates the eyebrows in a downward slant position, but other possible eyebrow slant positions can include (not pictured) an upward slant position, a horizontal slant position and/or an absence of eyebrows), a height of the forehead 813, a width of the forehead 814, a height of the cheekbone(s) 815, a width of the cheekbone(s) 816, a slope from the eyes to the nose 817, a slope from the eyes to the mouth 818, and/or a distance between the eyes 828, where the facial features 801 comprise a forehead 819, a left eyebrow 820, a right eyebrow 821, a left eye 822, a right eye 823, a nose, 824, a mouth 825, a left cheekbone 826, and a right cheekbone 827.

In some embodiments the ratios 829 can comprise a ratio of more than two of the facial features 801 (e.g., a ratio of the height of the face 802, the width of the mouth 811, and the height of the nose 808). In other embodiments the ratios 829 can be considered in conjunction with other facial features 801 (such as whether the mouth is open or closed (not pictured), whether a mustache is present or absent (not pictured), and/or whether a beard is present or absent (not pictured)).

Figure 9:
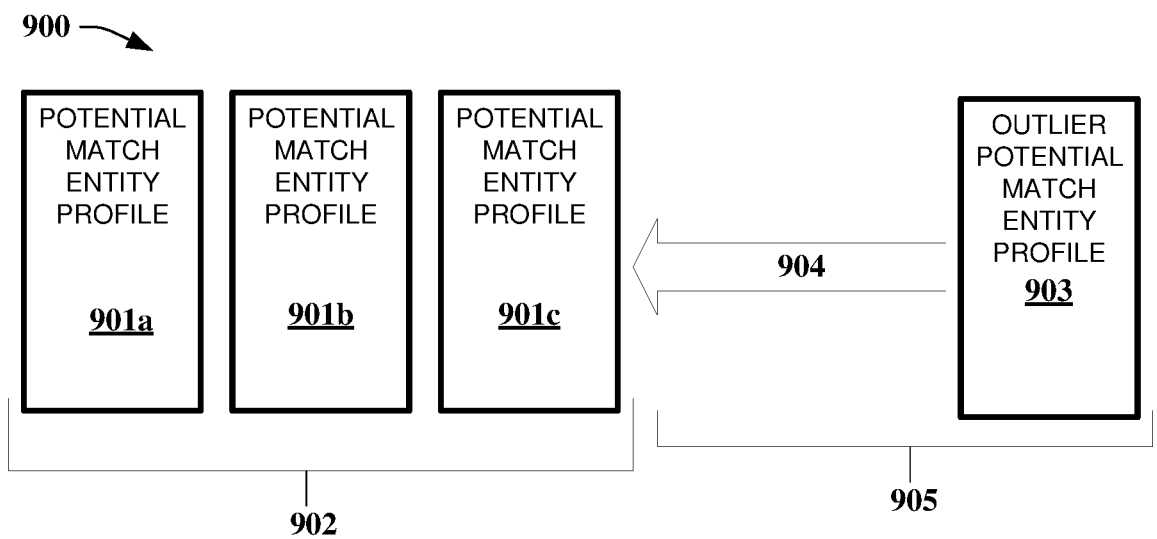
FIG. 9 illustrates an example block diagram of the operation of injecting an outlier potential match entity as supplemental input of the device illustrated in FIG. 2 and the system illustrated in FIG. 3, in accordance with various example embodiments.

FIG. 9 illustrates an example block diagram 900 of the operation of injecting 904 an outlier potential match entity 903 as supplemental input 902 of the device 200 illustrated in FIG. 2 and the system 300 illustrated in FIG. 3, in accordance with various example embodiments. After the machine learning models (not pictured) have identified a group of potential match entity profiles 902 comprising potential match entity profiles 901a-901c which meet the user's confidence criteria and/or preferences, the machine learning models (not pictured) can inject 904 one or more outlier potential match entity profile 903 as a supplemental input 905 to further train the machine learning models (not pictured). When the machine learning models (not pictured) inject 904 an outlier potential match entity profile 903, the user's selection or non-selection of the outlier potential match entity profile 903 can provide the machine learning models (not pictured) with additional information/data regarding the user's preference(s) and/or confidence criteria. It should be noted that the machine learning models (not pictured) can inject 904 more than one outlier potential match entity profile 903.

Figure 10:
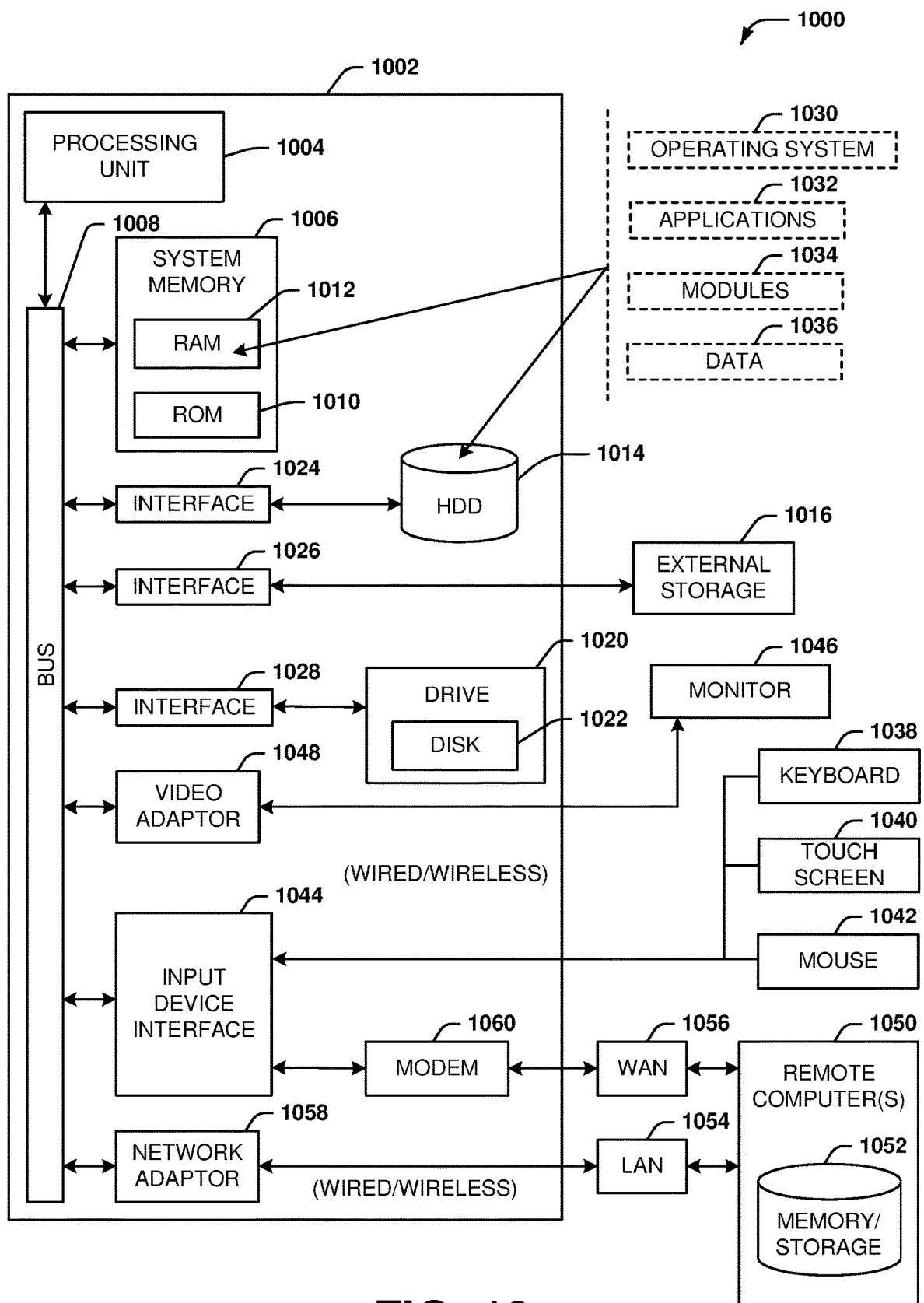
FIG. 10 illustrates a diagrammatic representation of a machine, in the example form, of a computer system within which a set of instructions, for causing the machine to perform any one or more of the methodologies discussed herein, may be executed.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 604.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 6. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of methods, devices, and/or systems explained herein can constitute machine-executable instructions embodied within a machine, e.g., embodied in a computer-readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is typically intended to mean an inclusive "or" rather than an exclusive "or." That is, unless specified otherwise, or clear from context, "X employs A or B" is intended to mean any of the natural inclusive permutations. That is, if X employs A alone, X employs B alone, X employs C alone, X employs A and B alone, X employs B and C alone, X employs A and C alone, or X employs A and B and C, then "X employs A, B or C" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A but not aspect B, and a second embodiment that has aspect B but not aspect A, does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Further, the term "include," "has," "contains," or other similar terms, are intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

What has been described above includes examples of methods, devices, and/or systems illustrative of the disclosed subject matter. It is, of course, not possible to describe every combination of components or methods herein. One of ordinary skill in the art may recognize that many further combinations and permutations of the claimed subject matter are possible. Illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Furthermore, embodiments can be combined, elements of embodiments can be excluded, etc. In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
training, by a system comprising a processor, a machine learning model with at least one first feature vector representative of at least one potential first match entity identified by a user of the system as input to a selection process for at least one matching entity to be a match for the user, the at least one first feature vector comprising at least one of:
at least one first ratio applicable to at least one facial first attribute of the at least one potential first match entity extracted from first facial recognition of at least one first image of the at least one potential first match entity,
at least one first height of the at least one potential first match entity,
at least one first hair color of the at least one potential first match entity, at least one first eye color of the at least one potential first match entity, or at least one first bias attributable to the user of the system applicable to the selection process for the at least one matching entity determined by first natural language processing of first textual content attributable to the at least one potential first match entity, resulting in a trained machine learning model, wherein the trained machine learning model is in a foreground execution space of the system, and wherein the trained machine learning model is further trained in a background processing space of the system while the trained machine learning model is usable for the selection process for the at least one matching entity in the foreground execution space;

updating the trained machine learning model comprising training the trained machine learning model further with at least one second feature vector representative of at least one potential second match entity identified by the user of the system as further input to the selection process for the at least one matching entity, the at least one second feature vector comprising at least one of:

at least one second ratio applicable to at least one second facial attribute of the at least one potential second match entity extracted from second facial recognition of at least one second image of the at least one potential second match entity, at least one second height of the at least one potential second match entity, at least one second hair color of the at least one potential second match entity, at least one second eye color of the at least one potential second match entity, or at least one second bias attributable to the user of the system further applicable to the selection process for the at least one matching entity determined by second natural language processing of second textual content attributable to the user of the system, resulting in a further trained machine learning model;

in response to the updating of the trained machine learning model, swapping the trained machine learning model out of the foreground execution space, and swapping the further trained machine learning model into the foreground execution space, resulting in an untrained machine learning model being in the foreground execution space and the trained machine learning model being in the background processing space;

in response to a defined criterion being satisfied, injecting an outlier potential match entity as supplemental input to the training of the trained machine learning model further with a supplemental feature vector representative of a supplemental match entity, not identified by the user of the system, as further input to the selection process for the at least one matching entity, the supplemental feature vector comprising at least one of:

a supplemental ratio applicable to a supplemental facial attribute of a potential supplemental match entity extracted from third facial recognition of a supplemental image of the at least one potential second match entity, a height of the potential supplemental match entity, a hair color of the potential supplemental match entity, or an eye color of the potential supplemental match entity;

iteratively performing the updating, the swapping, and the injecting for additional feature vectors representative of additional potential match entities received by the system as additional input to the selection process for the at least one matching entity, thereby continuously evolving the further trained machine learning model as a continuously evolved trained machine learning model applicable to the selection process for the at least one matching entity;

for candidate profiles accessible to the selection process for the at least one matching entity, applying the continuously evolved trained machine learning model to determine respective confidence values corresponding to the candidate profiles, wherein the respective confidence values represent respective likelihoods that the candidate profiles are part of the at least one matching entity of the selection process to be the match for the user; and as a defined function of the respective confidence values, rendering at least a profile image of profiles of the candidate profiles for the selection process.

2. The method of claim 1, wherein the defined function selects a top candidate profile of the candidate profiles having a highest confidence value of the respective confidence values.

3. The method of claim 1, wherein the defined function selects a top number of candidate profiles of the candidate profiles having the top number of highest confidence values of the respective confidence values.

4. The method of claim 1, wherein the defined function selects a top candidate profile of the candidate profiles having a confidence value between a highest confidence value of the respective confidence values and a lowest confidence value of the respective confidence values.

5. The method of claim 1, wherein the defined function selects a bottom candidate profile of the candidate profiles having a lowest confidence value of the respective confidence values.

6. The method of claim 1, wherein the at least one first ratio and the at least one second ratio comprise at least one of:

a first ratio of a first width of a face of the at least one potential match entity and at least one of:

a first height of the face of the at least one potential match entity, a vertical distance of eyes of the face of the at least one potential match entity, a horizontal distance of the eyes of the face of the at least one potential match entity, a horizontal positioning of the eyes of the face of the at least one potential match entity, a vertical positioning of the eyes of the face of the at least one potential match entity, a distance between the eyes of the face of the at least one potential match entity, a slant direction of eyebrows of the face of the at least one potential match entity, a second width of a nose of the face of the at least one potential match entity, a second height of the nose of the face of the at least one potential match entity, a third width of a mouth of the face of the at least one potential match entity, a third height of the mouth of the face of the at least one potential match entity, a fourth width of a forehead of the face of the at least one potential match entity, a fourth height of the forehead of the face of the at least one potential match entity, a fifth width of cheekbones of the face of the at least one potential match entity,
a fifth height of the cheekbones of the face of the at least one potential match entity,
a first slope from the eyes to the nose of the face of the at least one potential match entity, or
a second slope from the eyes to the mouth of the face of the at least one potential match entity,
a second ratio of the first width of the face of the at least one potential match entity and the vertical distance of the eyes of the face of the at least one potential match entity,
a third ratio of the first height of the face of the at least one potential match entity and at least one of:
the vertical distance of the eyes of the face of the at least one potential match entity,
the horizontal distance of the eyes of the face of the at least one potential match entity,
the horizontal positioning of the eyes of the face of the at least one potential match entity,
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a fourth ratio of the vertical distance of the eyes of the face of the at least one potential match entity and at least one of:
the horizontal distance of the eyes of the face of the at least one potential match entity,
the horizontal positioning of the eyes of the face of the at least one potential match entity,
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a fifth ratio of the horizontal distance of the eyes of the face of the at least one potential match entity and at least one of:
the horizontal positioning of the eyes of the face of the at least one potential match entity,
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a sixth ratio of the horizontal positioning of the eyes of the face of the at least one potential match entity and at least one of:
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity, the fifth height of the cheekbones of the face of the at least one potential match entity,
the first slope from the eyes to the nose of the face of the at least one potential match entity, or
the second slope from the eyes to the mouth of the face of the at least one potential match entity,
a seventh ratio of the vertical positioning of the eyes of the face of the at least one potential match entity and at least one of:
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
an eighth ratio of the distance between the eyes of the face of the at least one potential match entity and at least one of:
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a ninth ratio of the slant direction of the eyebrows of the face of the at least one potential match entity and at least one of:
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a tenth ratio of the second width of the nose of the face of the at least one potential match entity and at least one of:
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
an eleventh ratio of the second height of the nose of the face of the at least one potential match entity and at least one of:
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a twelfth ratio of the third width of the mouth of the face of the at least one potential match entity and at least one of:
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity, the first slope from the eyes to the nose of the face of the at least one potential match entity, or the second slope from the eyes to the mouth of the face of the at least one potential match entity, a thirteenth ratio of the third height of the mouth of the face of the at least one potential match entity and at least one of:

the fourth width of the forehead of the face of the at least one potential match entity, the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fourteenth ratio of the fourth width of the forehead of the face of the at least one potential match entity and at least one of:

the fourth height of the forehead of the face of the at least one potential match entity, the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a fifteenth ratio of the fourth height of the forehead of the face of the at least one potential match entity and at least one of:

the fifth width of the cheekbones of the face of the at least one potential match entity, the fifth height of the cheekbones of the face of the at least one potential match entity, the first slope from the eyes to the nose of the face of the at least one potential match entity, or the second slope from the eyes to the mouth of the face of the at least one potential match entity, a sixteenth ratio of the fifth width of the cheekbones of the face of the at least one potential match entity and at least one of:

the fifth height of the cheekbones of the face of the at least one potential match entity, wherein the second ratio is different from the first ratio, the first slope from the eyes to the nose of the face of the at least one potential match entity, or the second slope from the eyes to the mouth of the face of the at least one potential match entity, a seventeenth ratio of the fifth height of the cheekbones of the face of the at least one potential match entity and at least one of:

the first slope from the eyes to the nose of the face of the at least one potential match entity, or the second slope from the eyes to the mouth of the face of the at least one potential match entity, or an eighteenth ratio of the first slope from the eyes to the nose of the face of the at least one potential match entity and the second slope from the eyes to the mouth of the face of the at least one potential match entity.

7. The method of claim 1, wherein the updating the trained machine learning model further comprises:

predicting, based on the continuously evolved trained machine learning model, at least one candidate profile of the candidate profiles that is to be part of the at least one matching entity of the selection process to be the match for the user.

8. The method of claim 1, wherein the swapping the trained machine learning model and the further trained machine learning model is performed for a duration of usage of the trained machine learning model.

9. The method of claim 1, wherein the defined function sorts the candidate profiles in an order of a highest confidence value to a lowest confidence value.

10. A device, comprising:

a processor; and a memory that stores executable instructions that, when executed by the processor, facilitate performance of operations, comprising:

training, by the device, a machine learning model with first feature vectors representative of potential first match entities identified by at least one user of the device as inputs to a selection process for matching entities to be matches for the at least one user of the device, the first feature vectors respectively comprising:

first ratios applicable to facial first attributes of the potential first match entities extracted from first facial recognition of first images of the potential first match entities, first heights of the potential first match entities, first hair colors of the potential first match entities, first eye colors of the potential first match entities, or first biases attributable to the at least one user of the device applicable to the selection process for the matching entities determined by first natural language processing of first textual content attributable to the potential first match entities, resulting in a trained machine learning model, wherein the trained machine learning model is operable in a foreground execution space of the device, and wherein the trained machine learning model is further trained in a background processing space of the device while the trained machine learning model is usable for the selection process for the matching entities in the foreground execution space;

updating the trained machine learning model comprising training the trained machine learning model further with second feature vectors representative of potential second match entities identified by the at least one user of the device as further inputs to the selection process for the matching entities, the second feature vectors comprising:

second ratios applicable to second facial attributes of the potential second match entities extracted from second facial recognition of second images of the potential second match entities, second heights of the potential second match entities, second hair colors of the potential second match entities, second eye colors of the potential second match entities, or second biases attributable to the at least one user of the device further applicable to the selection process for the matching entities determined by second natural language processing of second textual content attributable to the at least one user of the device, resulting in a further trained machine learning model, wherein the updating the trained machine learning model comprises:
  swapping the trained machine learning model out of the foreground execution space, and swapping the further trained machine learning model into the foreground execution space, resulting in an untrained machine learning model being in the foreground execution space and the trained machine learning program being in the background processing space, and
  iteratively performing the updating and the swapping for additional feature vectors representative of additional potential match entities received by the device as additional inputs to the selection process for the matching entities, thereby continuously evolving the further trained machine learning model as a continuously evolved trained machine learning model applicable to the selection process for the matching entities;
in response to a defined criterion being satisfied, injecting outlier potential match entities as supplemental inputs to the training of the trained machine learning model further with supplemental feature vectors representative of supplemental match entities, not identified by the at least one user of the device, as further inputs to the selection process for the matching entities, the supplemental feature vectors comprising:
  supplemental ratios applicable to supplemental facial attributes of a potential supplemental match entities extracted from third facial recognition of supplemental images of the potential second match entities,
  heights of the potential supplemental match entities,
  hair colors of the potential supplemental match entities, or
  eye colors of the potential supplemental match entities;
for candidate profiles accessible to the selection process for the matching entities, applying the continuously evolved trained machine learning model to determine respective confidence values corresponding to the candidate profiles, wherein the respective confidence values represent respective likelihoods that the candidate profiles are part of the matching entities of the selection process to be the matches for the at least one user; and
as a defined function of the respective confidence values, rendering at least profile images of profiles of the candidate profiles for the selection process.

11. The device of claim 10, wherein the defined function selects a top candidate profile of the candidate profiles having a highest confidence value of the respective confidence values.

12. The device of claim 10, wherein the defined function selects a top number of candidate profiles of the candidate profiles having a top number of highest confidence values of the respective confidence values.

13. The device of claim 10, wherein the defined function selects a top candidate profile of the candidate profiles having a confidence value between a highest confidence value of the respective confidence values and a lowest confidence value of the respective confidence values.

14. The device of claim 10, wherein the defined function selects a bottom candidate profile of the candidate profiles having a lowest confidence value of the respective confidence values.

15. The device of claim 10, wherein the first ratios and the second ratios comprise at least one of:
  a first ratio of a first width of a face of the at least one potential match entity and at least one of:
    a first height of the face of the at least one potential match entity,
    a vertical distance of eyes of the face of the at least one potential match entity,
    a horizontal distance of the eyes of the face of the at least one potential match entity,
    a horizontal positioning of the eyes of the face of the at least one potential match entity,
    a vertical positioning of the eyes of the face of the at least one potential match entity,
    a distance between the eyes of the face of the at least one potential match entity,
    a slant direction of eyebrows of the face of the at least one potential match entity,
    a second width of a nose of the face of the at least one potential match entity,
    a second height of the nose of the face of the at least one potential match entity,
    a third width of a mouth of the face of the at least one potential match entity,
    a third height of the mouth of the face of the at least one potential match entity,
    a fourth width of a forehead of the face of the at least one potential match entity,
    a fourth height of the forehead of the face of the at least one potential match entity,
    a fifth width of cheekbones of the face of the at least one potential match entity,
    a fifth height of the cheekbones of the face of the at least one potential match entity,
    a first slope from the eyes to the nose of the face of the at least one potential match entity, or
    a second slope from the eyes to the mouth of the face of the at least one potential match entity,
  a second ratio of the first width of the face of the at least one potential match entity and the vertical distance of the eyes of the face of the at least one potential match entity,
  a third ratio of the first height of the face of the at least one potential match entity and at least one of:
    the vertical distance of the eyes of the face of the at least one potential match entity,
    the horizontal distance of the eyes of the face of the at least one potential match entity,
    the horizontal positioning of the eyes of the face of the at least one potential match entity,
    the vertical positioning of the eyes of the face of the at least one potential match entity,
    the distance between the eyes of the face of the at least one potential match entity,
    the slant direction of the eyebrows of the face of the at least one potential match entity,
    the second width of the nose of the face of the at least one potential match entity,
    the second height of the nose of the face of the at least one potential match entity,
    the third width of the mouth of the face of the at least one potential match entity,
    the third height of the mouth of the face of the at least one potential match entity,
    the fourth width of the forehead of the face of the at least one potential match entity, the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity, a fourth ratio of the vertical distance of the eyes of the face of the at least one potential match entity and at least one of:
the horizontal distance of the eyes of the face of the at least one potential match entity,
the horizontal positioning of the eyes of the face of the at least one potential match entity,
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity, a fifth ratio of the horizontal distance of the eyes of the face of the at least one potential match entity and at least one of:
the horizontal positioning of the eyes of the face of the at least one potential match entity,
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity, a sixth ratio of the horizontal positioning of the eyes of the face of the at least one potential match entity and at least one of:
the vertical positioning of the eyes of the face of the at least one potential match entity,
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity, a seventh ratio of the vertical positioning of the eyes of the face of the at least one potential match entity and at least one of:
the distance between the eyes of the face of the at least one potential match entity,
the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity, an eighth ratio of the distance between the eyes of the face of the at least one potential match entity and at least one of:

the slant direction of the eyebrows of the face of the at least one potential match entity,
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a ninth ratio of the slant direction of the eyebrows of the face of the at least one potential match entity and at least one of:
the second width of the nose of the face of the at least one potential match entity,
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a tenth ratio of the second width of the nose of the face of the at least one potential match entity and at least one of:
the second height of the nose of the face of the at least one potential match entity,
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
an eleventh ratio of the second height of the nose of the face of the at least one potential match entity and at least one of:
the third width of the mouth of the face of the at least one potential match entity,
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a twelfth ratio of the third width of the mouth of the face of the at least one potential match entity and at least one of:
the third height of the mouth of the face of the at least one potential match entity,
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a thirteenth ratio of the third height of the mouth of the face of the at least one potential match entity and at least one of:
the fourth width of the forehead of the face of the at least one potential match entity,
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a fourteenth ratio of the fourth width of the forehead of the face of the at least one potential match entity and at least one of:
the fourth height of the forehead of the face of the at least one potential match entity,
the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a fifteenth ratio of the fourth height of the forehead of the face of the at least one potential match entity and at least one of:

the fifth width of the cheekbones of the face of the at least one potential match entity,
the fifth height of the cheekbones of the face of the at least one potential match entity,
the first slope from the eyes to the nose of the face of the at least one potential match entity, or
the second slope from the eyes to the mouth of the face of the at least one potential match entity,
a sixteenth ratio of the fifth width of the cheekbones of the face of the at least one potential match entity and at least one of:
the fifth height of the cheekbones of the face of the at least one potential match entity, wherein the second ratio is different from the first ratio,
the first slope from the eyes to the nose of the face of the at least one potential match entity, or
the second slope from the eyes to the mouth of the face of the at least one potential match entity,
a seventeenth ratio of the fifth height of the cheekbones of the face of the at least one potential match entity and at least one of:
the first slope from the eyes to the nose of the face of the at least one potential match entity, or
the second slope from the eyes to the mouth of the face of the at least one potential match entity, or
an eighteenth ratio of the first slope from the eyes to the nose of the face of the at least one potential match entity and the second slope from the eyes to the mouth of the face of the at least one potential match entity.

16. The device of claim 10, wherein the updating the trained machine learning model further comprises:
predicting, based on the continuously evolved trained machine learning model, a candidate profile of the candidate profiles that will have a highest confidence value of the respective confidence values, resulting in a predicted profile.

17. The device of claim 10, wherein the swapping the trained machine learning model and the further trained machine learning model is performed for a duration of usage of the trained machine learning model.

18. The device of claim 16, the operations further comprising:
in response to the candidate profiles being determined not to satisfy the defined criterion, rendering at least profile images of profiles of the candidate profiles for the selection process having a lower confidence value than the predicted profile.

19. The device of claim 10, wherein the defined function sorts the candidate profiles in an order of a highest confidence value to a lowest confidence value.

20. A system, comprising:
at least one processor, comprising:
a first machine learning model in a foreground execution space; and
a second machine learning model in a background processing space; and
at least one memory that stores executable instructions that, when executed by the processor, facilitate performance of operations, comprising:
training, by the system, the first and second machine learning models with at least one first feature vector representative of at least one potential first match entity identified by a user of the system as input to a selection process for at least one matching entity to be a match for the user, the at least one first feature vector comprising at least one of:
at least one first ratio applicable to at least one facial first attribute of the at least one potential first match entity extracted from first facial recognition of at least one first image of the at least one potential first match entity,
at least one first height of the at least one potential first match entity,
at least one first hair color of the at least one potential first match entity,
at least one first eye color of the at least one potential first match entity, or
at least one first bias attributable to the user of the system applicable to the selection process for the at least one matching entity determined by first natural language processing of first textual content attributable to the at least one potential first match entity, resulting in a trained first machine learning model, wherein the second machine learning model is further trained while the trained first machine learning model is usable for the selection process for the at least one matching entity in the foreground execution space, resulting in a trained second machine learning model;
updating the trained second machine learning model comprising training the trained second machine learning model further with at least one second feature vector representative of at least one potential second match entity identified by the user of the system as further input to the selection process for the at least one matching entity, the at least one second feature vector comprising at least one of:
at least one second ratio applicable to at least one second facial attribute of the at least one potential second match entity extracted from second facial recognition of at least one second image of the at least one potential second match entity,
at least one second height of the at least one potential second match entity,
at least one second hair color of the at least one potential second match entity,
at least one second eye color of the at least one potential second match entity, or
at least one second bias attributable to the user of the system further applicable to the selection process for the at least one matching entity determined by second natural language processing of second textual content attributable to the user of the system, resulting in a further trained second machine learning model;
in response to the updating of the trained second machine learning model, swapping the trained first machine learning model out of the foreground execution space, and swapping the further trained second machine learning model into the foreground execution space, resulting in the further trained second machine learning model being in the foreground execution space and the trained first machine learning model being in the background processing space;
in response to a defined criterion being satisfied, injecting an outlier potential match entity as supplemental input to the training of the trained first machine learning model and the further trained second machine learning model further with a supplemental feature vector representative of a supplemental match entity, not identified by the user of the system, as further input to the selection process for the at least one matching entity, the supplemental feature vector comprising at least one of:
- a supplemental ratio applicable to a supplemental facial attribute of a potential supplemental match entity extracted from third facial recognition of a supplemental image of the at least one potential second match entity,
- a height of the potential supplemental match entity,
- a hair color of the potential supplemental match entity, or
- an eye color of the potential supplemental match entity;

iteratively performing the updating, the swapping, and the injecting for additional feature vectors representative of additional potential match entities received by the system as additional input to the selection process for the at least one matching entity, thereby continuously evolving the trained first machine learning model and the further trained second machine learning model as a continuously evolved trained machine learning model applicable to the selection process for the at least one matching entity;

for candidate profiles accessible to the selection process for the at least one matching entity, applying the continuously evolved trained machine learning model to determine respective confidence values corresponding to the candidate profiles, wherein the respective confidence values represent respective likelihoods that the candidate profiles are part of the at least one matching entity of the selection process to be the match for the user; and as a defined function of the respective confidence values, rendering at least a profile image of profiles of the candidate profiles for the selection process.

* * * * *